United States Patent
Ho et al.

(10) Patent No.: US 6,398,556 B1
(45) Date of Patent: Jun. 4, 2002

(54) INEXPENSIVE COMPUTER-AIDED LEARNING METHODS AND APPARATUS FOR LEARNERS

(76) Inventors: Chi Fai Ho, 965 Astoria Dr., Sunnyvale, CA (US) 94087; John P. Del Favero, Jr., 223 O'Keefe St., Menlo Park, CA (US) 94025; Peter P. Tong, 1807 Limetree La., Mountain View, CA (US) 94040

( * ) Notice: Subject to any disclaimer, the term of this patent is extended or adjusted under 35 U.S.C. 154(b) by 0 days.

(21) Appl. No.: 09/290,770

(22) Filed: Apr. 13, 1999

Related U.S. Application Data

(63) Continuation-in-part of application No. 09/110,569, filed on Jul. 6, 1998, now Pat. No. 6,126,448, and a continuation-in-part of application No. 09/273,392, filed on Mar. 22, 1999.

(51) Int. Cl.[7] .............................................. G09B 19/00
(52) U.S. Cl. ...................... 434/219; 434/118; 434/350; 706/927; 707/104; 708/131
(58) Field of Search ......................... 434/118, 219–234, 434/307 R, 308, 322, 323, 350, 362, 365; 704/270.1; 705/1, 2, 7–10, 14, 26, 37, 40–43, 70, 77; 706/927; 707/1, 3, 10, 100, 104, 203, 204, 501, 512, 513; 708/131, 160; 709/201, 212, 217–219, 228, 242; 713/200, 201; 345/967; 340/825.34; 380/29; 382/116, 309; 379/93.18

(56) References Cited

U.S. PATENT DOCUMENTS

| | | |
|---|---|---|
| 4,611,996 A | 9/1986 | Stoner |
| 5,035,625 A | 7/1991 | Monson et al. |
| 5,220,501 A * | 6/1993 | Lawlor et al. ................. 705/40 |
| 5,259,766 A | 11/1993 | Sack et al. |
| 5,306,154 A | 4/1994 | Ujita et al. |
| 5,316,485 A | 5/1994 | Hirose |
| 5,326,270 A | 7/1994 | Ostby et al. |
| 5,597,312 A | 1/1997 | Bloom et al. |
| 5,727,950 A | 3/1998 | Cook et al. |

(List continued on next page.)

OTHER PUBLICATIONS

Success Maker Courseware brochure, published by Computer Curriculum Corporation, Dec. 1994.
Active Mind Series from World Wide Web, URL = http://www.broderbund.com/studio/ams.html, 1996.
Logical Journal of the Zoombinis from World Wide Web, URL = http://www.broderbund.com/studio/atoz/zoombini.html, 1996.
Selecting Software by PC Novice Series, vol. 3, Issue 12, pp. 51, 64, and 89–92, 1995.

(List continued on next page.)

*Primary Examiner*—Joe H. Cheng
(74) *Attorney, Agent, or Firm*—Peter Tong

(57) ABSTRACT

A computer-aided learning method and apparatus for a learning user to learn materials inexpensively. Not only does the apparatus provide the user the freedom as to where and when to learn, and the guidance as to what to learn, the apparatus also reduces a significant hurdle to learning—Tuition. The apparatus retrieves a user identifier entered by the user, and determines whether the user is a learning user or an institute user. If the user is a learning user, the apparatus allows the user to access information regarding learning materials. If the user is an institute user, the apparatus permits the user to access information regarding at least one learning user. The institute user might be interested to use the apparatus to recruit employees to fill job openings. A learning user pays significantly less than an institute user to access information, so as to encourage the learning user to work on learning materials. The apparatus can also track and update information regarding the users.

86 Claims, 8 Drawing Sheets

U.S. PATENT DOCUMENTS

| | | | |
|---|---|---|---|
| 5,727,951 A | | 3/1998 | Ho et al. |
| 5,743,746 A | | 4/1998 | Ho et al. |
| 5,794,001 A | * | 8/1998 | Malone et al. ............... 345/762 |
| 5,794,178 A | | 8/1998 | Caid et al. |
| 5,794,207 A | * | 8/1998 | Walker et al. .................. 705/1 |
| 5,794,210 A | * | 8/1998 | Goldhaber et al. ............ 705/14 |
| 5,862,325 A | * | 1/1999 | Reed et al. .................. 709/201 |
| 5,884,270 A | | 3/1999 | Walker et al. |
| 5,892,900 A | * | 4/1999 | Ginter et al. ................ 713/200 |
| 5,920,861 A | * | 7/1999 | Hall et al. ...................... 707/9 |
| 6,006,191 A | * | 12/1999 | DiRienzo ........................ 705/2 |
| 6,031,577 A | * | 2/2000 | Ozkan et al. ................ 348/465 |
| 6,041,311 A | * | 3/2000 | Chislenko et al. ............. 705/27 |
| 6,157,808 A | * | 12/2000 | Hollingsworth .............. 434/350 |
| 6,282,630 B1 | * | 8/2001 | Nguyen et al. ................ 712/23 |

OTHER PUBLICATIONS

Computerized Adaptive Testing, Oct. 24, 1994, from World Wide Web, URL = Gopher://Gopher.ETS.org.

Innovation and Technologies, Oct. 21, 1994, from World Wide Web, URL = Gopher://Gopher.ETS.org.

Interactive Mathematic Instructor's Guide by Academic Systems, pp. 86 and 114, Aug. 1995.

High School Learning and Resource Library by ProOne, photocopy of the box and screen–dump to get 5 pages, 1995.

Asymetrix Librarian from www.asymetrix.com/products/librarian, 1998.

PeopleSoft Human Resources Management Solution, 1998.

CareerMosaic URL = http://www.careermosaic.com, 1998.

Career.com www.career.com, 1994–1999.

CareerPath.com www.careerpath.com, 1997–1999.

America's Learning Exchange www.alx.org, 1998.

Telecommunications Industry by Nova, 1996.

FreeLearning.com www.freelearning.com, 1999.

Youth@work by Nova Private Industry Council www.youthatwork.com, 1997.

* cited by examiner

INEXPENSIVE COMPUTER-AIDED LEARNING METHODS AND APPARATUS FOR LEARNERS

CROSS-REFERENCE TO RELATED APPLICATIONS

This is a continuation-in-part of U.S. patent application Ser. No. 09/110,569, filed on Jul. 6, 1998, now U.S. Pat. No. 6,126,448, and is also a continuation-in-part of co-pending U.S. patent application Ser. No. 09/273,392, filed on Mar. 22, 1999, both are entitled "Computer-Aided Learning And Counseling Methods And Apparatus For A Job", and are incorporated by reference into this application.

BACKGROUND OF THE INVENTION

This invention relates generally to computer-aided learning methods and apparatus, and more particularly to inexpensive computer-aided learning methods and apparatus for learners.

We are living in the midst of tremendous technological changes. In the workplace, technology is replacing numerous workers. Many of our job skills might become obsolete within years. Though technology is permeating gradually into every stratum of the society, it is very hard to keep up with so much changes.

Not only is it hard to keep up, technology has made the world much smaller, and global competition much more intense. Not only facing global competition, we are also challenged by the younger generation. Many of them have access to computers and the Web at a very young age. They might be much more effective and efficient than the older generation in performing computer-oriented jobs.

Drastic and rapid changes in the economy lead to massive re-deployment of the labor force. Due to technology revolutions in the industrial nations, and social upheaval in many third-world countries, every year, thousands of job titles with their job functions are being eliminated. Numerous industries experience massive layoffs, which are usually more geared towards the older and higher-paid employees. This problem is exacerbated by the aging of the population when employers tend to retain the younger work force, with more current education. Many employees are in transition. They need jobs. Such global challenges are not limited to the private industries. Millions of civil service employees and military personnel have to be re-trained.

Employees have to learn. However, employees may not have time to learn. Computer-aided learning alleviates some of the problem because learning from a computer at least allows users to learn at their own pace and, to a certain degree, in a location more convenient to them. But, computer-aided learning is a new medium of learning, not accustomed to by many. To ask them to pay a high tuition to learn through a new medium is unreasonable. Moreover, many may not be accustomed to learn while working. They assume that they have finished with all of their learning at schools. Also, for the numerous employees-in-transition, they may not be interested to pay to learn at all.

From the employers' perspective, they need to stay competitive. Employers have to produce good products and services at reasonable prices. With competition from so many directions, employers have to constantly re-train their employees and recruit new ones. It is also not uncommon for employers to lay off some of them.

Is It is a constant challenge for employers to decide whom to hire. Just as employees need to learn about new job skills, employers need to learn about the strengths, weaknesses and preferences of their employees or potential employees.

It should be apparent that there is a need to automatically provide appropriate learning materials in an inexpensive and easily accessible manner to employees, while providing information about potential employees to employers.

SUMMARY OF THE INVENTION

The present invention provides computer-aided learning methods and apparatus that encourage employees to learn appropriate learning materials by providing them in an inexpensive and easily accessible manner, while allow employers to access information on potential employees.

A computer-aided learning system can provide users with learning materials in an easily accessible manner, significantly increasing their freedom to choose when and where to learn. The learning materials can also be quickly updated. In view of the drastic technological and societal changes, it is imperative that learning materials have to constantly keep pace with the changes.

On the other hand, learning through a computer has at least one major challenge. It is a relatively new approach to learning. Since many assume that they have done with all of their learning at schools, and are skeptical to anything that is not traditional, they are not interested in paying a lot of money to learn from a computer.

Though many do not want to pay a lot to learn from computers, computer-aided learning materials are not cheap to produce. It is difficult to prepare good computer-aided learning materials that not only can capture our attention, but also teach effectively. Companies that have invested heavily in producing these materials are not about to sell them inexpensively. They need to recoup their investment.

Drastic technological and society changes require companies to transform themselves to stay competitive. They need to find people to do new jobs. Hiring the right employee is a critical success factor for many employers. Many companies are willing to pay at least 20% of the first annual income of their new hires to recruiters because recruiters save them time in finding and pre-screening candidates. Also, good recruiters know their candidates, and are able to provide companies with valuable information on them. Typically, companies have a better chance of making the right hiring decision if they have more information on a candidate.

New computer-aided learning systems and methods can provide a lot of learning information regarding a user, as taught in a number of issued patents, such as Learning System And Method Based on Review, U.S. Pat. No. 5,863,208; Methods and Apparatus To Assess And Enhance A Student's Understanding In A Subject, U.S. Pat. No. 5,779,486; Relationship-Based Computer-Aided Educational System, U.S. Pat. No. 5,727,951; Reward Enriched Learning System And Method, U.S. Pat. No. 5,743,746; and Learning Method And System Based on Questioning, U.S. Pat. No. 5,836,771.

Information on users' learning activities is very useful for employers because they provide indication on many factors, including what the users know and their preferences. Many companies are willing to pay for such information.

In view of the above observations and insights, the invented methods and apparatus provide inexpensive computer-aided learning materials to users to work on. Such users can be known as learning users. Though the materials can be of high quality and can be specifically tailored to the needs of the users, the learning users do not have to pay much to learn from the materials. The costs of the learning materials and the services providing them are predominantly paid for by employers or institute users.

In return, the present invention allows institute users to access information regarding the learning users. The information can help institute users recruit the right people for their job openings, such as based on information from the learning activities of potential employees.

In one embodiment, there are at least two types of users: Learning users and institute users. An institute user can be a representative from a company, or can be a software agent from the company. An apparatus is configured to retrieve a user identifier entered by a user, and determine the type of user based on the identifier.

If the user is a learning user, the apparatus allows the user to access information regarding learning materials. The apparatus can track the user's learning activities and update the user's profile accordingly.

If the user is an institute user, the apparatus allows the user to access information regarding at least one learning user. As the institute user is querying information, the apparatus can track the institute user's activities and keep a log of its use. If the institute user is interested in recruiting, the apparatus may automatically perform the best match between attributes of the potential candidate for the job and attributes of the users in its database. In yet another embodiment, the institute user may also use the present invention to conduct in-house training for its employees.

To encourage learning users to learn, they do not have to pay much to learn. If possible, money should not be a factor that deters users to learn from the apparatus. On the other hand, institute users have to pay significantly more than the learning users to access information from the apparatus. In one embodiment, it is free for the learning users to access information regarding learning materials, but institute users have to pay to access information regarding learning users from the apparatus.

Other aspects and advantages of the present invention will become apparent from the following detailed description, which, when taken in conjunction with the accompanying drawings, illustrates by way of example the principles of the invention.

Same numerals in FIGS. 1–7 are assigned to similar elements in all the figures. Embodiments of the invention are discussed below with reference to FIGS. 1–7. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
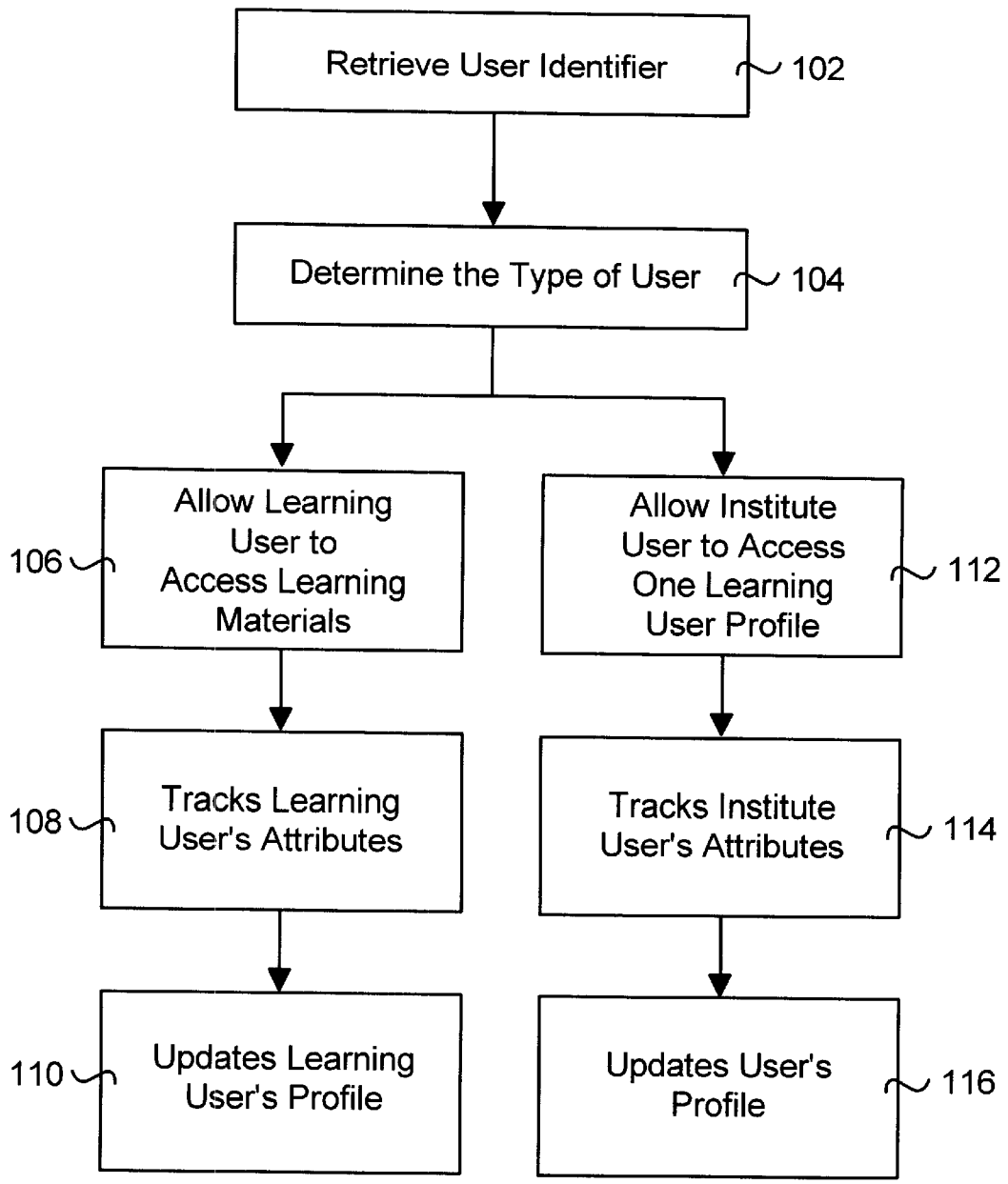
FIG. 1 shows one set of steps to implement one embodiment of the present invention.
Figure 2:
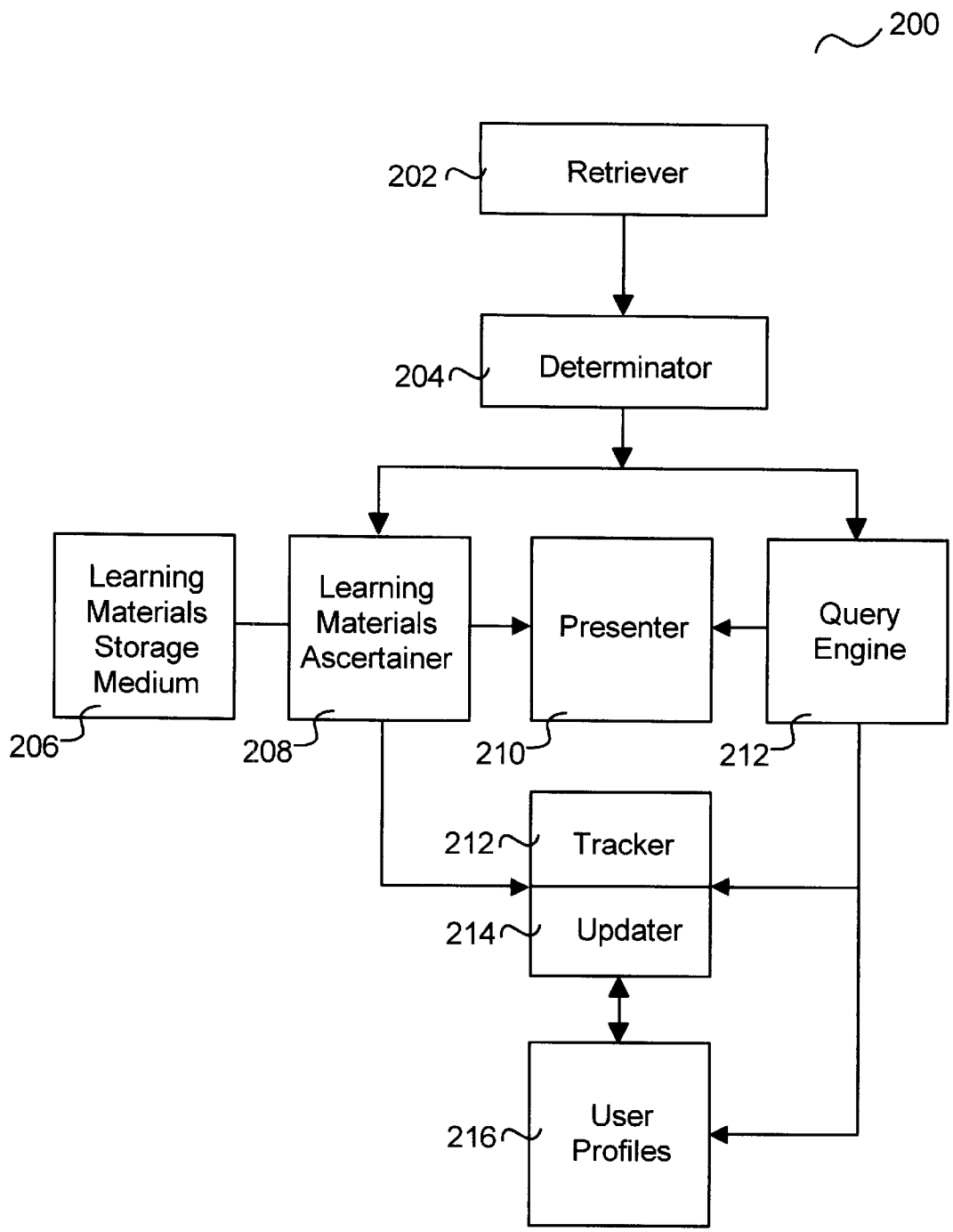
FIG. 2 shows an apparatus to implement one embodiment of the present invention.
Figure 3:
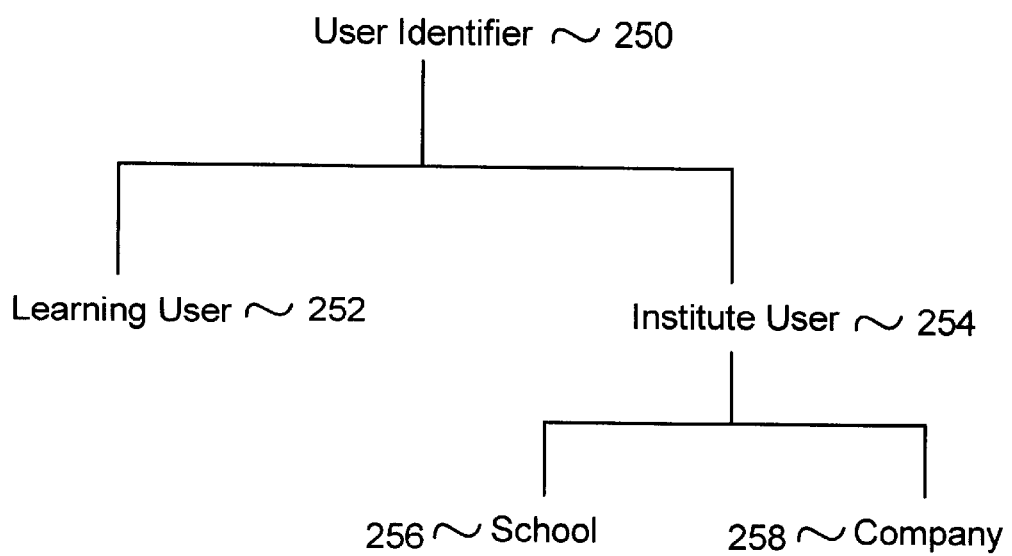
FIG. 3 shows examples of different types of users for the present invention.

There are a number of ways to implement the present invention. FIG. 1 shows one set of steps, 100, to implement one such embodiment by, for example, an apparatus shown in FIG. 2, while FIG. 3 shows examples of different types of users using the apparatus. There can be other types of users, such as system administrators, but only two are shown in FIG. 3.

In one embodiment, there are at least two types of users: Those who are primarily interested to use the apparatus 200 to work on learning materials, and they are known as the learning users, 252; and those who are primarily interested in learning about the learning users, and they are known as the institute user, 254. In another embodiment, if the user is primarily interested in finding a job or in career counseling, the user would be classified as a learning user. In yet another embodiment, a learning user is not allowed to access the learning activities of other learning users through the apparatus. In one embodiment, a learning user is not allowed to access the learning end results of other learning users through the apparatus. Learning end results can be defined as the end results of learning a subject matter, such as the grade one gets after finishing a course, or whether one has received a certificate or graduated from a course.

An institute user, 254, can be a school, 256, or a company, 258; or a representative from a school or a company. Each user has its own user identification, which can be a number that identifies the user.

A retriever 202 retrieves (Step 102) the user identifier 250 entered by the user into the apparatus. In one embodiment, the user is a first time user, and the apparatus 200 asks the user a number of questions. Based on the answers, the apparatus creates a user profile of the user, which contains information regarding the user.

Initially, for example, the user may be asked if he is a primarily interested to work on learning materials. If his answer is yes, he would be classified as a learning user. If his answer is no, he would be classified as an institute user.

Figure 4:
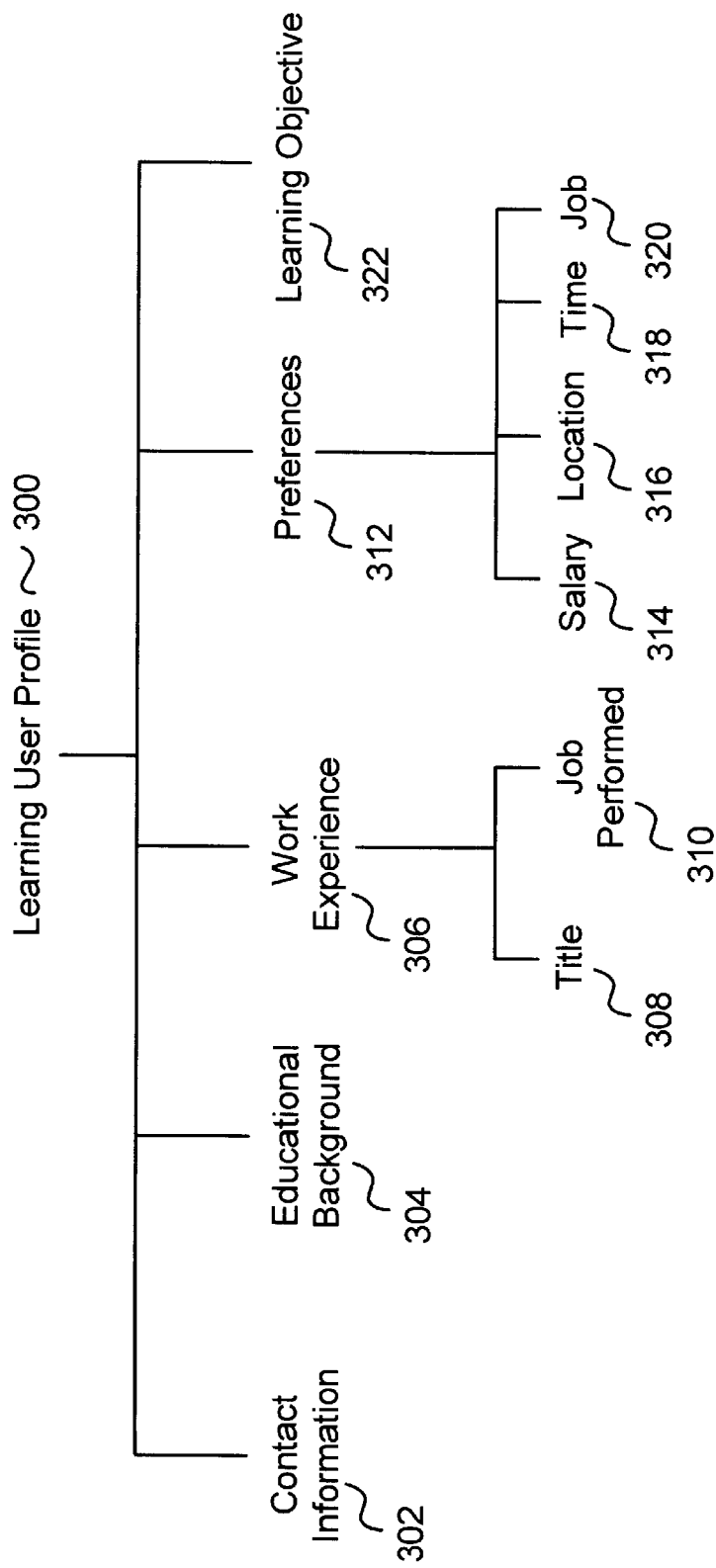
FIG. 4 shows examples of attributes of the learning user in the present invention.

FIG. 4 shows examples of information or attributes regarding a learning user, 300. One attribute is his contact information, 302, such as his residential address, phone number and email address.

Another attribute is his educational background 304, including his year(s) of graduation, degree(s) obtained and name(s) of school(s). The educational background can also include his previous learning history, such as classes he took, when he took them and whether he received graduation certificates or not.

Another attribute is his work experience 306, including his previous job title(s), 308, and previous job(s) performed, 310, such as the type of projects, and when they were done. Such questions can be presented as multiple choice questions for the user to pick an answer.

Another attribute can be his preferences, 312, including salary, 314, location, 316, time, 318, and job 320. The location preference includes his preferred work location, such as working two days from home, and three days at a location within a 50 miles radius from home. The location preference can also include his preferred learning location. The time preference includes his preferred work hours, such as from 9 am to 5 pm, or willingness to work overtime every other workday during the workweek. The time preference, 318, can also include his preferred learning time, such as at night after 6 pm. The job preference, 320, includes the type of job he is interested in, such as to be a Web master.

Another attribute can be his learning objective, 322, including what he wants to learn. The learning objective, 322, can be determined for him, based on, for example, his job preference, educational background and previous work experience. This will be further explained below.

Other additional attributes include his name. The user may be asked to scan in his picture, which can be a JPEG file.

It can be up to the user to decide if he wants to enter some of the above information, such as his picture, into his user profile. Also, certain information in his profile can be kept confidential if the user desires. For example, the apparatus can maintain his contact information confidential, restricting institute users from gaining access, unless permitted by the learning user otherwise.

In one embodiment, information about the learning user can be categorized as confidential and non-confidential. Institute users have access to non-confidential information, but confidential information is not accessible without express consent from the learning user. When the learning user is entering information into the apparatus, he can also designate them as confidential or non-confidential.

In another embodiment, the user is not a first time user. He enters his user identifier into the apparatus. The retriever 202 retrieves the user identifier entered for a determinator 204 to determine (Step 104) its type. In this example, the user is a learning user, 252, and is allowed (Step 106) access to learning materials. The learning materials can be in a learning materials storage medium, 206, which may be accessible through a network, such as the World Wide Web.

In one embodiment, a learning material ascertainer, 208, ascertains learning materials for the learning user, 252. The ascertainer can ascertain a learning objective for the user, which depends on information regarding the user.

The ascertainer can identify the objective or learning materials based on applying a set of rules to, for example, the user's educational background, work experience and preferences. The user's work experience provides indications on his experience and knowledge in specific areas. As an example, if he spends a lot of time on a project, the ascertainer infers that he understands the project, and the subject areas behind the project. This implies that he does not need to work on introductory materials in those areas. To illustrate, the ascertainer can consider the amount of time to train an average user with similar educational background as the user for a job the user prefers. If a recent computer science graduate needs to take a two-semester class to become an average Java programmer, and if the user has been working on C++ projects for the past five years, the ascertainer would decide that he only needs to take a one-semester class with less introductory materials to become an average Java programmer. Another example is that the preferred job is to be a patent paralegal. The user has been a general paralegal for the last six years, but does not understand the procedures of patent prosecution. Then the learning objective would be to learn such procedures in the next nine months.

Based on the ascertained learning objective, the ascertainer could also select for the user, or guide the user to, learning materials to prepare the user for the job position. For example, the objective is to learn how to speak introductory Spanish in six months. The ascertainer can then select the place and the time to learn, or can identify the computer-based training classes available for her to learn. The identification process can be based on key words. As another example, the learning objective is to learn how to write fictions. Then, the ascertainer, based on words such as write and fictions, searches the learning material storage medium or other resources for learning materials whose titles have the same two key words.

In one embodiment, the ascertainer directly identifies learning materials for the user, without first identifying his learning objective.

One embodiment includes a presenter, 210, for presenting the ascertained learning materials to the user.

The learning user's information, including his usage of the apparatus, 200, can be tracked by the apparatus, 200. One embodiment includes a tracker 212 to track the user's information or attributes (Step 108), and an updater 214 to update (Step 110) the user's profile, such as his learning profile, based on the tracked information. In one embodiment, tracking includes analyzing, and the tracked information includes analyzed information.

Figure 5:
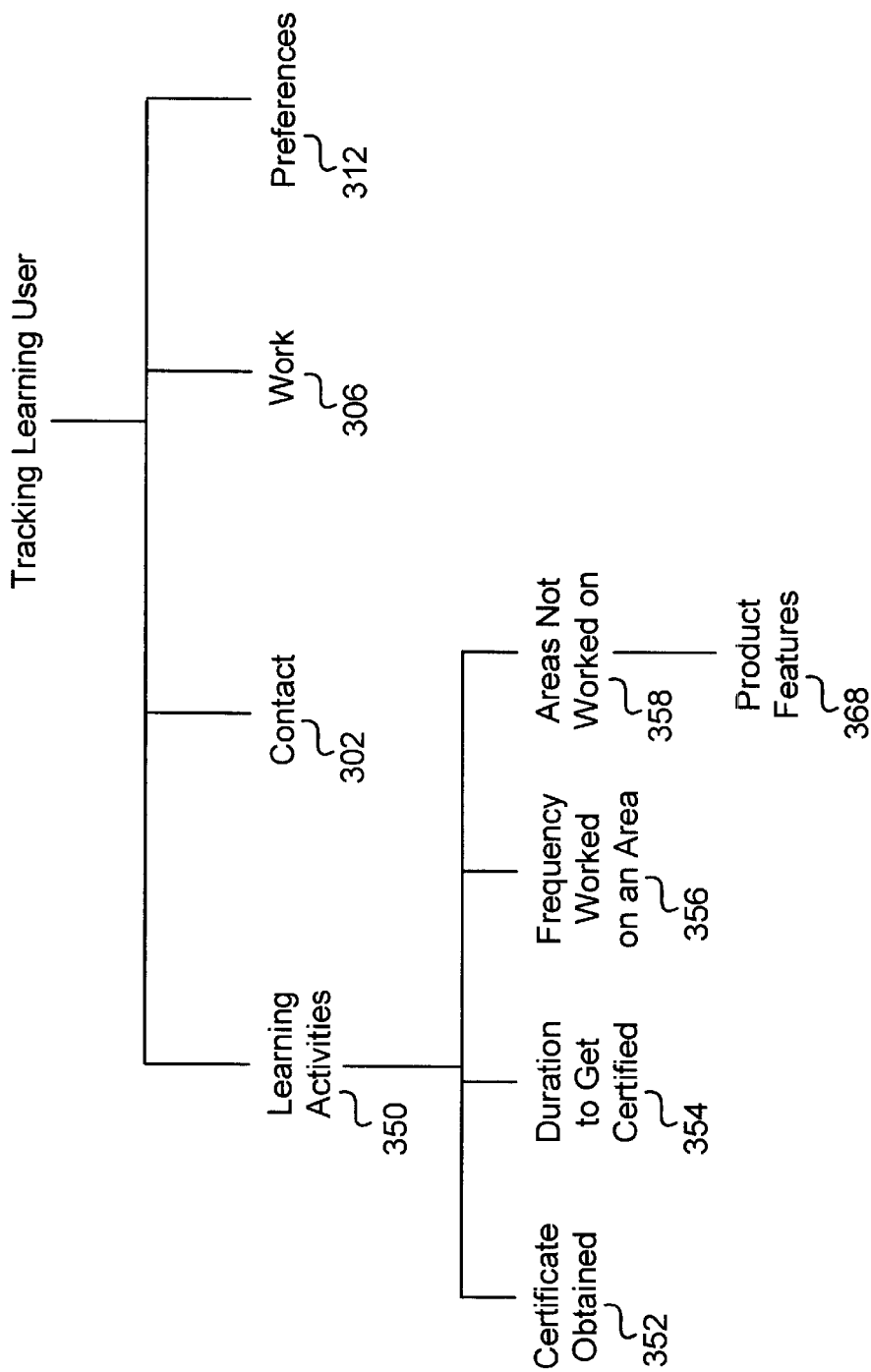
FIG. 5 shows examples of tracking attributes of the learning user in the present invention.

FIG. 5 shows examples of attributes or information regarding the user that the tracker 212 can track. They include the user's contact information, 302, work experience, 306, and preferences 312. As the user logs into the apparatus, 200, the apparatus can ask the user if he has recently changed anyone of the above attributes to keep track of his progress and interests. If he has, the updater 214 can update the user profiles accordingly. In one embodiment, the user can access and change his profile directly.

The tracker can also track the user's learning activities, 350. This can include the classes he has received certificates from after graduation, 352; the degree he received; the duration of time it took him to get the certification or the degree, 354; and his performance, if available. The learning activities can also include the frequencies he worked on an area, 356.

Rules can be applied to such tracked information to provide additional information regarding the user, such as indication as to the user's understanding level in an area. For example, if an average user takes one month to finish the course, and he needs a much longer time period, such as three months, probably, he is weak in that subject. Another example is that if he works on an area repeatedly, probably, he is quite weak in that area.

The learning activities can also include the areas, 358, he has not worked on. For example, he is using the apparatus to learn features in a new product, 368, of a company. It turns out that he has never worked one specific feature the company believes customers really value. This might provide indication to the company as to the importance of that feature.

The information tracked, either by themselves or after analysis, can be provided to the updater 214 to update information regarding the user, such as updating his profile previously stored. For example, he has received a certificate from a company after he finished the training program offered by the company on its new product. His user profile can be updated by such information. As another example, if the analyzed result is that he is strong in fixing engines, such information is stored in his user profile. In one embodiment, with his permission, institute users are allowed access to such information.

The tracking and updating processes can be for billing and accounting purposes. What is accountable can include, for example, the amount of time spent on the apparatus. Based on the tracked and updated information, records can be generated to create invoices for the learning user.

The user can be an institute user, 254. The determinator 204 can allow the user to access information regarding at least one learning user (Step 112), such as using a query engine, 212, to query information regarding the at least one learning user. The institute user can also query her own profile.

Figure 6:
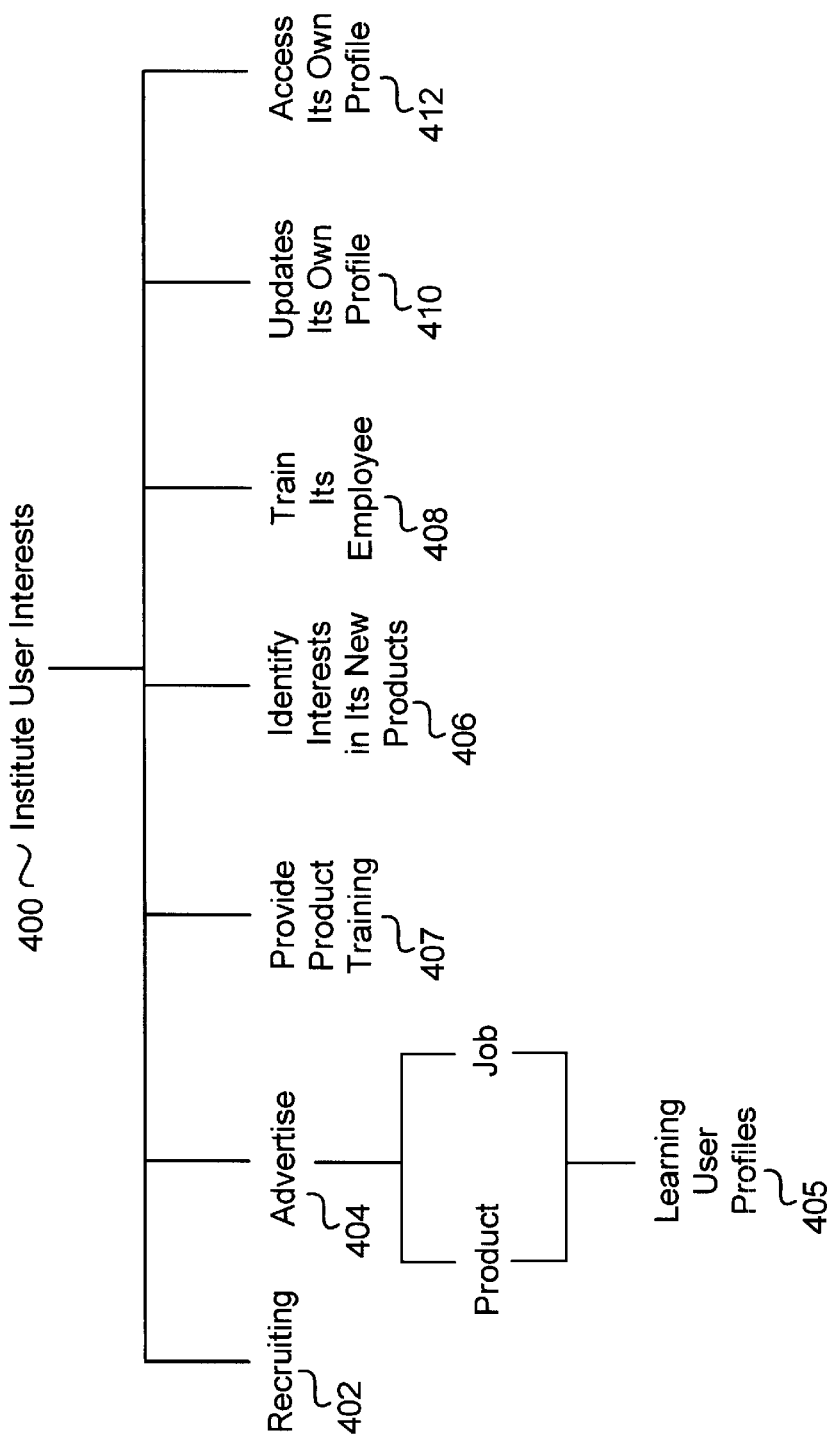
FIG. 6 shows examples of interests of the institute users in the present invention.

FIG. 6 shows examples of interests, 400, of the institute user. The tracker 212 can track (Step 114) her attributes, including her usage of the apparatus; and an updater, 214, can update (Step 116) her profile, 216, if necessary.

She might be interested in recruiting, 402, candidates to join her institute. She can query users' profiles to access information regarding learning users. Information of interests can include some of his learning activities, such as the certificate received after working on a subject matter; the frequency a candidate changed jobs; his job preferences; his previous work experience; and his physical location.

In one embodiment, the institute user can access at least some learning activities of learning users. The extent of activities the institute user can access can be up to individual learning users. For example, one learning user may allow the institute user free access of all of its learning activities; and another learning user may restrict the institute user from accessing the titles of the courses he failed.

The institute user can query the system, by asking questions. Methods for a system to comprehend and to answer questions can be found, for example, in U.S. Patent, entitled, Learning Method And System Based on Questioning, U.S. Pat. No. 5,836,771.

In another embodiment, she can answer multiple choice questions from the apparatus to formulate her request. She can specify characteristics of her ideal candidate. Based on her specifications, the query engine 212 can automatically search and identify the one or more candidates with best-matched profiles with the characteristics of the ideal candidate. In another embodiment, based on her answers, software agents configured by her or the query engine, can be generated to search the user profile database automatically for a number candidates that best match her requests. The agents or searches can be automatically activated due to changes in information of the institute user, or changes in information of certain learning users. Criteria of searches can be automatically updated in view of such changes before the query engine automatically launches the appropriate search. For example, the institute user might have to find two such candidates instead of one. Such updates and searches can be done daily or weekly.

The apparatus can further establish contact between the institute user and the one or more candidates identified. For example, initially, the candidates identified by the searches do not have to include their name, but just their qualifications. In one embodiment, if the institute user is interested in one or more of the candidates identified, she can highlight those candidates. The apparatus would have general information regarding the position transmitted to the candidates. An interested candidate can have his identity revealed to the institute user, again through the apparatus. With the candidate's permission, his picture can also be transmitted to the institute user. Then the apparatus can have the institute user's identity with a more detailed description of the job position transmitted to the candidate, and can set up an initial interview for the candidate.

The tracker 212 can track a number of the institute user's recruiting activities, such as (i) the number of candidates she identified to be potential candidates, (ii) the number of candidates referred to her, and (iii) the number of queries she did, and the time she did each of them. The updater 214 can update her profile based on the tracked information. This can be for setting up billing and accounting records. Such records can be used to create invoices for the institute user.

The institute user might be interested in advertising, 404, her job opening to be filled, or her product, which can be a service. The apparatus includes an advertisement generator, which allows her to advertise. In one embodiment, the generator formats the advertisement provided by the user, based on instructions from the user. For example, the user might specify the size of the advertisement, and its location. The advertisement can be targeted directly to specific users, 405, interested in her institute, such as interested in her products, or her type of jobs. This can be done, for example, by showing the advertisement on the screen of the learning materials related to the institute, such as related to the products or the type of jobs. In one embodiment, the advertisement is only presented to learning users. In another embodiment, the advertisement can be restricted from being presented to other institute users that sell products similar to the institute user, or are in the same field or industry sector as the institute user. As an example, the institute user is in home construction, and her advertisement of recruiting construction workers will not be presented to other home construction institute users.

The tracker 212 can track the size of the advertisement, the location the advertisement to be placed, the number of advertisements posted, and the duration of the postings. The tracker can also track the number of times the page with her advertisement has been accessed. The updater can update information of the institute user based on the tracked information. Then, the information regarding learning users the institute can access includes the number of times her advertisement has been shown to learning users.

She might want to use the apparatus as technical supports for her products, by providing appropriate training, 407, for them. She might also want to identify interests, 406, in her new products. In one embodiment, she can provide learning materials regarding her new products to the apparatus for users to learn. For example, her new product is a handheld machine. Learning users can use the apparatus to learn how to use the many features of the machine. The tracker tracks the usage of the learning users. The institute user has built into the machine a feature X and a feature Y that typical users have to learn before they know how to use them. The institute user thinks that feature X is dynamic, and none of their competitors have such a feature; and feature Y should be quite easy to use. However, less than 1% of the users have learnt how to use feature X. Also, 90% of learning users have difficulties learning how to use feature Y, as shown, for example, by the same learning users going back to learn feature Y more than three times. Such information regarding learning users can be tracked to provide market information on (learning users' interests in) the machine back to the institute user. The institute user can use such market information to help them improve on their next release. For example, probably for the next generation handheld machine, feature X should be dropped, and the user-friendliness aspect of feature Y should be enhanced. One way to feed the learning users' interests back to the institute user is by updating the institute user profile with such information.

Her interest might be to train her employees, 408, such as by providing in-house training for them. She can also get training herself through accessing learning materials. For example, she is a project supervisor using the apparatus to learn new techniques in HDSL installation, and to hire a person for ISDN installation. In one embodiment, she can be both an institute user and a learning user by having two different user identifiers.

She might be interested in updating her information or profile, 410, or accessing them, 412. The tracker can track the number of times she accessed or updated her profile, and the updater can update such user information accordingly.

To encourage learning users to work on learning materials, in one embodiment, they pay significantly less than institute users to access information from the apparatus. For example, institute users pay much more to query information from the apparatus than learning users to access learning materials from the apparatus. In one embodiment, learning users are paying significantly less when the annual payment or annual subscription fee of a learning user is less than $1/500$ times of that of an institute user.

In another embodiment, a learning user is paying significantly less when it is free for the learning user to access information from the apparatus, while the institute user has to pay. The learning user does not have to pay the owner of the apparatus 200 or the provider of the method, 100, to access information, but the institute user has to.

In yet another embodiment, a learning user is paying significantly less when the learning user is paying approximately the per capita cost of operating the apparatus, and the institute user is paying above the per capita cost of operating the apparatus. One definition of per capita cost is the total expense of operating the apparatus divided by the total number of learning and institute users of the apparatus.

In one embodiment, a learning user is paying significantly less when the learning user is paying below the per capita cost of operating the apparatus, and the institute user is paying above the per capita cost of operating the apparatus.

Figure 7A:
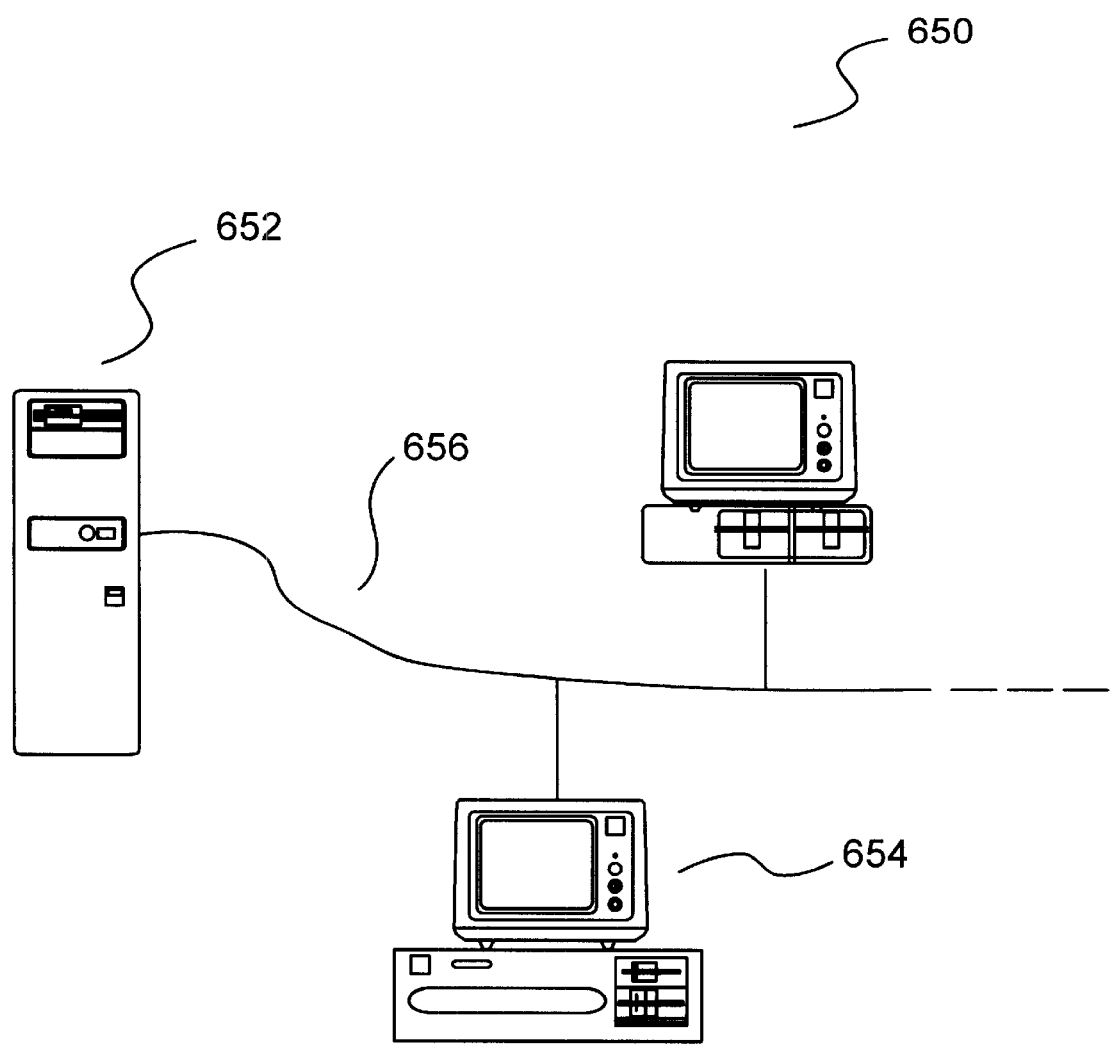
FIGS. 7A–B show examples of hardware to implement one embodiment of the present invention.
Figure 7B:
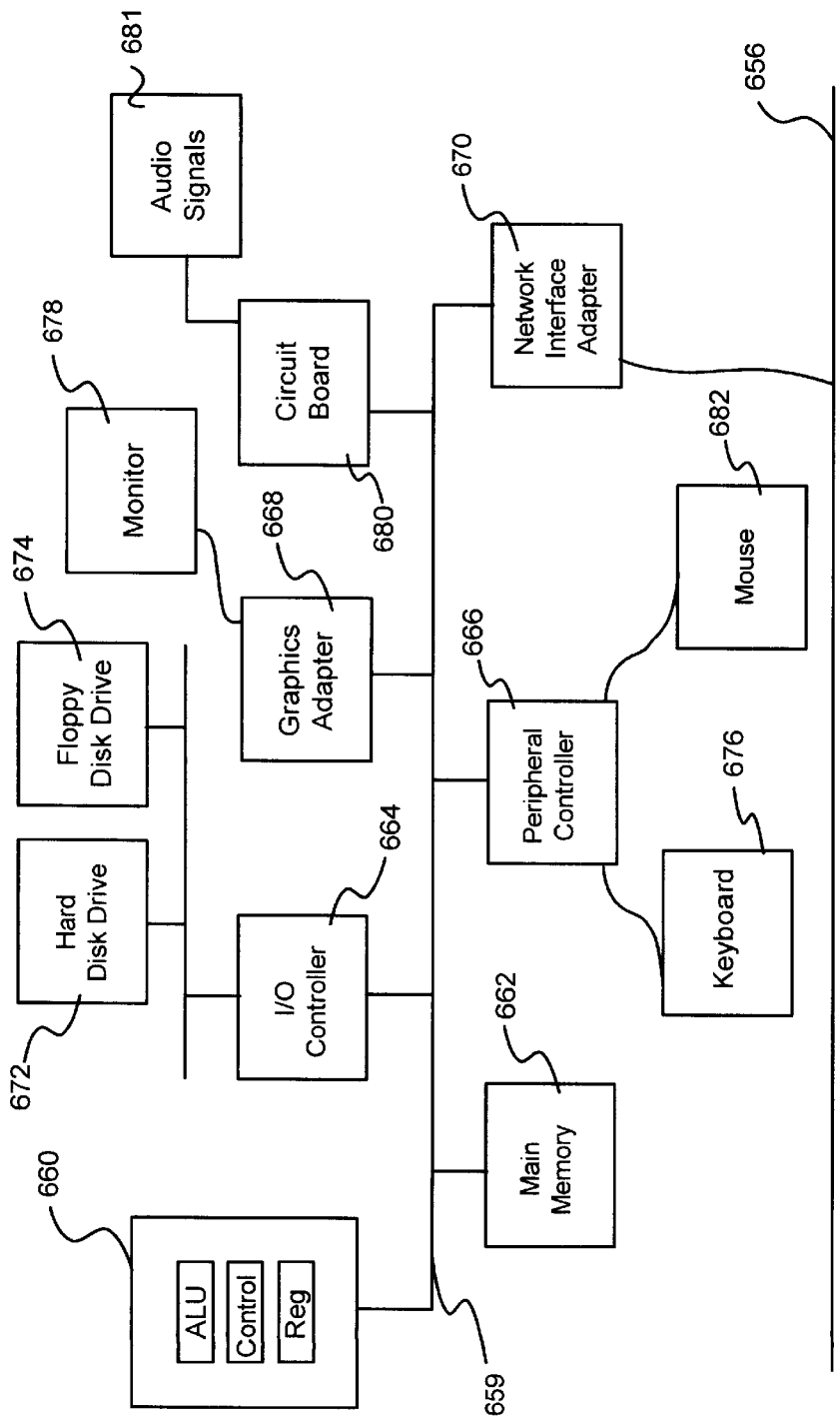

FIGS. 7A–B show examples of hardware to implement one embodiment of the present invention. FIG. 7A shows one physical embodiment 650 implementing one embodiment of the invention, preferably in software and hardware. The embodiment 650 includes a server computer 652 and a number of client computers, such as 654, which can be a personal computer. Each client computer communicates to the server computer 652 through a dedicated communication link, or a computer network 656.

FIG. 7B shows one embodiment of a client computer 654. It typically includes a bus 659 connecting a number of components, such as a processing unit 660, a main memory 662, an I/O controller 664, a peripheral controller 666, a graphics adapter 668, a circuit board 680 and a network interface adapter 670. The I/O controller 664 is connected to components, such as a harddisk drive 672 or a floppy disk drive 674. The peripheral controller 666 can be connected to one or more peripheral components, such as a keyboard 676 or a pointing device 682. The graphics adapter 668 can be connected to a monitor 678. The circuit board 680 can be coupled to audio signals 681; and the network interface adapter 670 can be connected to the network 656, which can be the Internet, an intranet, the Web or other forms of networks. The processing unit 660 can be an application specific chip. In another embodiment, the client computer 654 is a thin-client, with much less computation and memory power than the server computer, 652.

Different elements in the present invention may be in different physical components. For example, the apparatus may be in a client computer. In another embodiment, the apparatus is in a client computer, except the learning materials storage medium, which is in a server computer. In yet another embodiment, the server computer also hosts a storage medium with the user profiles, 216. In one embodiment, the apparatus is in the server computer, except the presenter, which is in the client computer. The user receives information accessed from the client computer.

It should be obvious to those skilled in the art that different elements in the present invention can be implemented in hardware or software or both. For example, the determinator and the query engine can be written in software, or can be on a circuit, such as a field-programmable-gate-array, where the program embodying the determinator and the query engine is burnt into a circuit. As another example, a processing unit 660 can implement the determinator; a main memory 662 can store the user profile; the same or a different processing unit can implement the retriever and the query engine; and the same main memory or a different memory can store the learning material storage medium.

One embodiment of the present invention can be implemented in a Web server. The server includes a HTTP server or program that understands HTTP or equivalent protocol. Just as an example, the name of the server is www.joblearn.com.

A user executes his browser in his computer to access learning materials by entering an URL, such as the following:

http://www.joblearn.com/job/user= tassels&subject?vendor=microsoft&product=excel From the URL, the browser determines that the protocol to use is HTTP. The browser also determines that the data packets are constructed based on the TCP format to establish a connection with the Web server, as specified by the HTTP protocol.

The browser then extracts the name of the Web server from the second component of the URL— www.joblearn.com—and attempts to establish a connection to the server.

To establish the connection, the browser can identify the IP address of the server. For example, the browser may retrieve the IP address from a domain name server.

Based on the IP address, the browser sends a request to the Web server to establish a TCP connection with the HTTP program running on the server. This can be through establishing the connection to the server with the default TCP port number, 80, for the HTTP program.

After the Web server receives and accepts the request, the browser transmits to the Web server other portions of the URL job/user=tassels&subject?vendor=microsoft&product= excel. The Web server examines them, and invokes a program named job. Assume that previously a Web master has configured the Web server to identify the term, job, at that part of the URL as an indication of invoking an embodiment of the present invention. The Web server also determines that the remaining portions of the URL is a CGI script. To simplify the description, instead of stating that the program, job, does a certain task, the description states that the Web server does the task.

The script indicates that the user is identified as tassels. Based on information previously stored, the Web server, based on the program, job, determines the identifier belong to a learning user. The Web server further determines that tassels intends to learn Microsoft Corporation's product Excel. Appropriate learning materials are then re-transmitted back to the browser to be presented to the learner.

In the above example, information is accessed through a HTTP server. Other commonly available accessing mechanisms are also applicable, such as JDBC or CORBA.

In addition to learning, the user may be asked to update changes in his profile, such as changes in his learning objectives. For example, he has changed his interest, and presently, he wants to learn how to build a house. Based on his availability, appropriate classes and/or learning materials are directed to him.

The Web server can also track his progress as he is learning. In this example, assume that classes are available through his computer. The server can perform a number of tracking tasks. For example, the Web server can mark the screen he looks at before he logs off from the server; the Web server can keep track of the duration of time for him to finish the course; and the server can keep track of whether or not he has graduated from the course. His user profile can be updated by such tracked information and analyzed data. Also, such information regarding the learning user can be accessed by institute users.

In another example, assume that the user is an institute user who may be interested in generating an advertisement on the Web server. As an example, a Web page generated by the Web server for an institute user includes a dialog box with an advertising button. Clicking that button by the institute user brings up an advertising file upload page, which can include questions, such as the size of the advertisement, the location, the pricing structure, and the time to post the advertisement. The location can specify the area on a typical screen, and the subject matter the screen is displaying. The user also can attach to the file, her advertisement clip, which can be a html page, a Java applet, an audio stream, animated streaming data, such as a video stream or a multimedia stream, or other file formats, or some combination of the above. The video stream or multimedia stream may be compressed by standard algorithms, such as based on MPEG format. The advertisement clip can be used as a banner and can be linked to learning materials related to the products sold by the institute user. When such learning materials are shown on a screen, the advertisement banner will be shown also. Through the institute user's browser, he can upload the file with the attachment clip to the Web server. In one embodiment, the advertisement clip can be hypertext-linked to the institute user's home page.

The Web server can monitor the number of hits on the page with the advertisement, or the number of times the clip or the advertisement was accessed. The Web server can also monitor the number times the institute's own home page has been hypertext-linked. Such information can be stored as information regarding the corresponding users accessing the clip or linking to the institute user's home page. If the users are learning users, such information can be considered as information regarding the learning users. Also, such information can be stored in the institute user profile area.

The institute user may like to change its advertisement on the Web server. In one embodiment, she is allowed to modify the scripts for the Java applet or the html page. She may be allowed to generate a modified clip to be uploaded to the Web server.

The institute user may be interested in accessing her profile to determine the number of hits on the clip. Statistics, such as the type of users accessing that clip, can also be stored in the profile area of the institute user.

The usage by the institute user with the results can be tracked, and stored in the institute user profile area.

Using a Web server to host the apparatus or a part of the apparatus, 200, can make economic sense. The price of developing the apparatus, or a portion of the apparatus, 200, on a Web server and maintaining it may cost a few million dollars. However, once developed, many users can access information through it from many places and at any time. If the learning users do not have to pay much to learn from it, one main obstacle of learning—tuition—is removed. Not only can the server (a) give the learning users the freedom to choose when, and in many occasions, where to learn, and (b) guide the users to the appropriate learning materials to fill their individual needs, learning from the server is also relatively inexpensive. Many more will learn and benefit from the invention. This will enrich them, help their career and, ultimately, help their employers and the society.

From another perspective, with many people learning from the server, a large database of information regarding learning users can be created. Many institute users are interested in the server in view of the large database of information regarding learning users, and the heavy traffic by those users. Institute users are interested for many different reasons. For example, they might want to use it to hire employees. For companies to succeed, they need the right employees, and they are willing to pay recruiters to get them. As an illustration, assume a company hires 25 employees per year from the server, and the average annual income with benefit of the 25 employees is $50,000. The company normally pays at least 20% of the annual income to recruiters. This translates to paying the recruiters $250,000 per year.

In additional to recruiting, the company can use the server to advertise their products and their jobs to users interested in them. Those users can be easily identified by, for example, the learning materials they work on, and their preferences as shown in their user profiles.

The company may also want to use the server to support their products. This can be done by having learning materials regarding their products available for learning users of the server.

The company can also use the server as to find out users' interest in their products. With learning materials on the products at the server, the company can measure users' interest in different features of the products by identifying how often materials regarding different features are being accessed, as discussed above.

Thus, institute users are willing to make reasonable payments to use the server. They are probably willing to pay much higher than what learning users are willing to pay. The institute users might even prefer to provide learning users with free access to the server. This is because the institute users are interested in lots of information regarding learning users, and a lot of traffic through the server.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A computer-aided learning method for a user comprising the steps of:

retrieving, by a first computer, materials related to the user;

permitting, by the computer, the user to access materials regarding at least one learning user if the user is an institute user, as determined based on an identifier of the user;

wherein if the user is the institute user, the institute user can learn about the at least one learning user in an area the institute user is interested;

wherein the materials accessed can be retrieved by at least one of the users from another computer, which is connected to the first computer through a network; and wherein the institute user pays to access materials regarding the at least one learning user; a learning user is allowed to access materials to learn; and materials on at least one of the users can be tracked and updated.

2. A computer-aided learning method as recited in claim 1 further comprising the steps of:

tracking, by the computer, materials regarding the user; and updating, by the computer, materials regarding the user based on the tracked materials.

3. A computer-aided learning method as recited in claim 2 further comprising the step of ascertaining materials for the user to learn if the user is a learning user.

4. A computer-aided learning method as recited in claim 3 wherein the step of ascertaining depends on the user's educational background, work experience and preferences.

5. A computer-aided learning method as recited in claim 2 wherein if the user is a learning user, the step of tracking includes tracking the user's learning activities.

6. A computer-aided learning method as recited in claim 5 wherein the learning activities tracked includes the duration of time the user learns a subject matter.

7. A computer-aided learning method as recited in claim 5 wherein:

the user is learning features of a product; and the activities tracked include the one or more features the user worked on.

8. A computer-aided learning method as recited in claim 7 wherein the method is implemented at a Web site.

9. A computer-aided learning method as recited in claim 2 wherein a learning user may restrict institute users from accessing certain materials regarding the learning user.

10. A computer-aided learning method as recited in claim 2 wherein the institute user accesses the materials to identify a learning user for filling a job position.

11. A computer-aided learning method as recited in claim 10 further comprising the step of querying materials on learning users to identify a learning user to fill the job position based on criteria set by the institute user.

12. A computer-aided learning method as recited in claim 9 wherein the step of querying can be automatically activated due to changes in the criteria set.

13. A computer-aided learning method as recited in claim 9 further comprising the step of establishing contact between the institute user and the learning user identified.

14. A computer-aided learning method as recited in claim 10 wherein the method is implemented at a Web site.

15. A computer-aided learning method as recited in claim 2 further comprising the step of allowing the user to advertise if the user is an institute user.

16. A computer-aided learning method as recited in claim 15 wherein the advertisement is in at least one of the following areas: a product introduced by the institute user and the institute user's job position to be filled.

17. A computer-aided learning method as recited in claim 15 wherein the advertisement can be targeted directly to learning users interested in the institute user.

18. A computer-aided learning method as recited in claim 15 wherein the advertisement is restricted from being presented to other institute users that are in the same field as the institute user.

19. A computer-aided learning method as recited in claim 15 wherein the advertisement is restricted from being presented to other institute users that sell products similar to the institute user.

20. A computer-aided learning method as recited in claim 15 wherein the method is implemented at a Web site.

21. A computer-aided learning method as recited in claim 20 further comprising the step of monitoring the number of times the institute user's advertising page has been accessed.

22. A computer-aided learning method as recited in claim 2 wherein the materials to learn includes materials on features of a product introduced by an institute user.

23. A computer-aided learning method as recited in claim 2 wherein the method is implemented at a Web site.

24. A computer-aided learning method as recited in claim 1 wherein materials regarding the at least one learning user is categorized into confidential and nonconfidential such that confidential materials are not accessible by the institute user without the at least one learning user's express consent.

25. A computer-aided learning apparatus for a user comprising:

A retriever configured to retreive materials related to the user; and

A determinator configured to permit the user to access materials regarding at least one learning user if the user is an institute user, as determined based on an identifier of the user;

wherein if the user is the institute user, the institute user can learn about the at least one learning user in an area the institute user is interested;

wherein the materials accessed can be retrieved by at least one of the users from another computer, which is connected to the apparatus through a network; and wherein the institute user pays to access materials regarding the at least one learning user; a learning user is allowed to access materials to learn; and materials on at least one of the users can be tracked and updated.

26. A computer-aided learning apparatus as recited in claim 25 further comprising:

a tracker configured to track materials regarding the user; and an updater configured to update materials regarding the user based on the tracked materials.

27. A computer-aided learning apparatus as recited in claim 26 further comprising a learning materials ascertainer configured to ascertain materials for the user to learn if the user is a learning user.

28. A computer-aided learning apparatus as recited in claim 27 wherein the institute user accesses the materials to identify a learning user for filling a job position.

29. A computer-aided learning apparatus as recited in claim 34 further comprising an advertisement generator configured to allow the user to advertise if the user is an institute user.

30. A computer-aided learning apparatus as recited in claim 29 wherein the materials to learn include materials on features of a product introduced by an institute user; and materials regarding a learning user includes the learning user's interest in the product.

31. A computer-aided learning apparatus as recited in claim 25 wherein materials regarding the at least one learning user are categorized into confidential and nonconfidential such that confidential materials are not accessible by the institute user without the at least one learning user's express consent.

32. A computer-aided learning method for a user comprising:

receiving, by a receiving computer, materials entered by the user; and presenting, by the receiving computer, materials accessed by the user;

wherein the receiving computer is coupled to another computer through a network, and the another computer retrieves materials related to the user; permits the user to access materials regarding at least one learning user if the user is an institute user, as determined based on an identifier of the user; wherein if the user is the institute user, the institute user can learn about the at least one learning user in an area the institute user is interested; and allows the user to access materials to learn if the user is a learning user, who pays less than an institute user to access materials, so as to encourage the learning user to work on materials to learn; and materials on at least one of the users can be tracked and updated.

33. A computer-aided learning method as recited in claim 32 wherein materials accessed by a learning user include materials on a product of an institute user, with advertisement related to that institute user also presented if the materials are accessed.

34. A computer-aided learning method as recited in claim 33 wherein the advertisement is related to the product of the institute user.

35. A computer-aided learning method as recited in claim 34 wherein the receiving computer includes a browser; and the network includes the Internet.

36. A computer-aided learning method as recited in claim 35 wherein materials tracked include materials of the learning user, and the tracking affects the materials presented to the learning user.

37. A computer-aided learning method for a user comprising:
    retrieving, by a computer, materials related to the user; and
    permitting, by the computer, the user to access materials regarding at least one learning user if the user is an institute user, as determined based on an identifier of the user;
    wherein if the user is the institute user, the institute user can learn about the at least one learning user in at least an area the institute user is interested;
    wherein the materials accessed can be presented by another computer, which is connected to the computer through a network; and
    wherein the institute user pays to access materials regarding the at least one learning user; a learning user is allowed to access materials on a product of the institute user, with advertisement related to that institute user also presented if the materials are accessed; and materials on at least one of the users can be tracked and updated.

38. A computer-aided learning method as recited in claim 37 wherein the advertisement is related to the product of the institute user.

39. A computer-aided learning method as recited in claim 34 wherein the another computer includes a browser; and the network includes the Internet.

40. A computer-aided learning method as recited in claim 39 wherein materials tracked include materials of a learning user, and the tracking affects the materials presented to the learning user.

41. A computer-aided learning method for a user comprising:
    receiving, by a receiving computer, materials entered by the user; and
    presenting, by the receiving computer, materials accessed by the user;
    wherein the receiving computer is coupled to another computer through a network, and the another computer permits the user to access materials regarding at least one learning user if the user is an institute user, as determined based on an identifier of the user;
    wherein if the user is the institute user, the institute user can learn about the at least one learning user in at least an area the institute user is interested;
    wherein the institute user pays to access materials regarding the at least one learning user; a learning user is allowed to access materials on a product of the institute user, with advertisement related to that institute user also presented if the materials are accessed; and materials on at least one of the users can be tracked and updated.

42. A computer-aided learning method as recited in claim 41 wherein the advertisement is related to the product of the institute user.

43. A computer-aided learning method as recited in claim 42 wherein the receiving computer includes a browser; and the network includes the Internet.

44. A computer-aided learning method as recited in claim 43 wherein materials tracked include materials of a learning user, and the tracking affects the material presented to the learning user.

45. A computer-aided learning apparatus for a user comprising:
    a retreiver configured to retreive materials related to the user; and
    a determinator configured to permit the user to access materials regarding at least one learning user if the user is an institute user, as determined based on an identifier of the user;
    wherein if the user is the institute user, the institute user can learn about the at least one learning user in at least an area the institute user is interested;
    wherein the materials accessed can be presented by another computer, which is connected to the apparatus through a network; and
    wherein the institute user pays to access materials regarding the at least learning user; a learning user is allowed to access materials on a product of the institute user, with advertisement related to that institute user also presented if the materials are accessed; and materials on at least one of the users can be tracked and updated.

46. A computer-aided learning apparatus as recited in claim 45 wherein the advertisement is related to the product of the institute user.

47. A computer-aided learning apparatus as recited in claim 46 wherein the another computer includes a browser; and the network includes the Internet.

48. A computer-aided learning apparatus as recited in claim 47 wherein materials tracked include materials of a learning user, and the tracking affects the materials presented to the learning user.

49. A computer-aided learning apparatus for a user comprising:
    a receiver configured to receive materials entered by the user; and
    a presenter configured to present materials accessed by the user;
    wherein the apparatus is coupled to another computer through a network, and the another computer permits the user to access materials regarding at least one learning user if the user is an institute user, as determined based on an identifier of the user;

wherein if the user is the institute user, the institute user can learn about the at least one learning user in at least an area the institute user is interested; and wherein the institute user pays to access materials regarding the at least one learning user; and learning user is allowed to access materials on a product of the institute user, with advertisement related to that institute user also presented if the materials are accessed; and materials on at least one of the users can be tracked and updated.

50. A computer-aided learning apparatus as recited in claim 49 wherein the advertisement is related to the product of the institute user.

51. A computer-aided learning apparatus as recited in claim 50 further comprising:
a browser; and
wherein the network includes the Internet.

52. A computer-aided learning apparatus as recited in claim 51 wherein materials tracked include materials of a learning user, and the tracking affects the materials presented to the learning user.

53. A computer-aided learning method for a user comprising the steps of:
retreiving, by a first computer, materials related to the user;
permitting, by the computer, the user access materials regarding at least one learning user if the user is an insitute user, as determined based on an identifier of the user;
wherein if the user is the institute user, the institute user can learn about the at least one learning user in an area the institute user is interested;
wherein the materials accessed can be retreived by at least one of the users from another computer, which is connected to the first computer through a network;
wherein the institute user pays so that materials can be accessed;
wherein a learning user is allowed to access materials to learn;
wherein materials on at least one of the users can be monitored and updated; and
wherein the first computer includes a Web server.

54. A computer-aided learning method as recited in claim 53 wherein the learning user allowed to access materials, works for the institute user.

55. A computer-aided learning method as recited in claim 53 wherein learning user allowed to access materials is a customer of the institute user.

56. A computer-aided learning method as recited in claim 53 wherein at least a portion of the materials to learn depends on an attribute of the learning user allowed to access materials.

57. A computer-aided learning method as recited in claim 53 wherein at least a portion of the materials to learn depends on an area related to the background of the learning user allowed to access materials.

58. A computer-aided learning method as recited in claim 53 wherein at least a portion of the materials to learn depends on an interest of the learning user allowed to access materials.

59. A computer-aided learning method as recited in claim 53 wherein at least a portion of the material to learn depends on a job of the learning user allowed to access materials.

60. A computer-aided learning method as recited in claim 53 wherein the learning progress of the learning user allowed to access materials is monitored.

61. A computer-aided learning method as recited in claim 60 wherein at least a portion of materials to learn depends on the learning progress of the learning user allowed to access materials.

62. A computer-aided learning method as recited in claim 60 wherein at least a portion of the materials skipped in learning by the learning user allowed to access materials, is identified.

63. A computer-aided learning method as recited in claim 53 further comprising testing the learning user allowed to access materials.

64. A computer-aided learning method as recited in claim 53 wherein at least a portion of the materials to learn depends on an objective of the institute user.

65. A computer-aided learning method as recited in claim 64 wherein at least a portion of the materials to learn is modified as the objective of the institute user changes.

66. A computer-aided learning method as recited in claim 53 wherein at least a portion of the materials to learn is from the institute user.

67. A computer-aided learning method as recited in claim 53 further comprising identifying by the institute user a person to do a job depending on an objective of the institute user.

68. A computer-aided learning method as recited in claim 53 wherein the learning user allowed to access materials is monitored, and the method further comprises identifying by the institute user that learning user to do a job based on materials regarding that learning user.

69. A computer-aided learning method as recited in claim 53 wherein at least a portion of the materials to learn allows the learning user to follow a scenario to solve a problem in a job.

70. A computer-aided learning method as recited in claim 53 further comprising searching the materials to learn, to identify materials under a title.

71. A computer-aided learning method as recited in claim 70 further comprising prioritizing the searched results to be presented.

72. A computer-aided learning methos as recited in claim 53 wherein at least a portion of the materials to learn is modularized as learning objects.

73. A computer-aided learning method as recited in claim 53
wherein the learning user allowed to access materials, works for the institute user,
wherein the method further comprises testing that learning user, and
wherein the learning progress of that learning user is monitored.

74. A computer-aided learning method as recited in claim 73
wherein at least a portion of the materials to learn depends on an objective of the institute user, and
wherein at least a portion of the materials to learn is from the institute user.

75. A computer-aided learning method as recited in claim 74 further comprising searching the materials to learn, to identify materials under a title;
wherein at least a portion of the materials to learn is for a customer of the institute user to learn.

76. A computer-aided learning method as recited in claim 75 wherein materials related to the title are also identified.

77. A computer-aided learning method as recited in claim 74
wherein at least a portion of the materials to learn is modularized as learning objects, wherein at least a portion of the materials to learn depends on a job of that learning user, and wherein at least a portion of materials to learn depends on that learning user's learning progress.

78. A computer-aided learning method as recited in claim 77 further comprising identifying by the institute user a person to do a job depending on an objective of the institute user.

79. A computer-aided learning method as recited in claim 74 further comprising identifying by the institute user a person to do a job depending on an objective of the institute user;

wherein at least a portion of the materials to learn depends on a job of that institute user.

80. A computer-aided learning method as recited in claim 73 wherein at least a portion of the materials to learn is modularized as learning objects, wherein at least a portion of the materials to learn is for a customer of the institute user to learn, and wherein at least a portion of the materials to learn, depends on a job of that learning user.

81. A computer-aided learning method as recited in claim 80 further comprising searching the materials to learn, to identify materials under a title; and identifying by the institute user that learning user to do a job based on an objective of the user, and materials regarding that learning user.

82. A computer-aided learning method as recited in claim 73 wherein at least a portion of the materials to learn depends on an interest of that learning user, and wherein at least a portion of the materials to learn depends on a job of that learning user.

83. A computer-aided learning method as recited in claim 82 further comprising searching the materials to learn, to identify materials under a title; and prioritizing the searched results to be presented;

wherein at least a portion of the materials to learn is modularized as learning objects; and wherein at least a portion of the materials to learn allows that learning user to follow a scenario to solve a problem in a job.

84. A computer-aided learning method as recited in claim 73 wherein at least a portion of the materials to learn is for a customer of the institute user to learn, wherein at least a portion of the materials to learn depends on an interest of that learning user, and wherein at least a portion of the materials to learn depends on an area related to the background of that learning user.

85. A computer-aided learning method as recited in claim 84 further comprising searching the materials to learn, to identify materials under a title;

wherein at least a portion of the materials to learn is modularized as learning objects, and wherein at least a portion of the materials to learn allows that learning user to follow a scenario to solve a problem in a job.

86. A computer-aided learning method as recited in claim 85 further comprising identifying by the institute user that learning user to do a job based on materials regarding that learning user;

wherein at least a portion of the materials that learning user skipped in learning is identified.

* * * * *

UNITED STATES PATENT AND TRADEMARK OFFICE
CERTIFICATE OF CORRECTION

PATENT NO. : 6,398,556 B1
DATED : June 4, 2002
INVENTOR(S) : Ho et al.

It is certified that error appears in the above-identified patent and that said Letters Patent is hereby corrected as shown below:

Column 1,
Line 66, change "Is It is" to -- It is --.

Column 13,
Line 43, change "in claim 9" to -- in claim 11 --.
Line 46, change "in claim 9" to -- in claim 11 --.

Column 14,
Line 7, change "includes materials" to -- include materials --.
Line 17, change "to retreive" to -- to retrieve --.
Line 48, change "in claim 34" to -- in claim 28 --.

Column 15,
Line 56, change "in claim 34" to -- in claim 38 --.

Column 16,
Line 24, change "the material" to -- the materials --.
Line 29, change "a retreiver" to -- a retriever --.
Line 29, change "to retreive" to -- to retrieve --.
Line 42, change "least learning user" to -- least one learning user --.

Column 17,
Line 5, change "and learning user" to -- a learning user --.
Line 24, change "retreiving, by" to -- retrieving, by --.
Line 26, change "access materials" to -- to access materials --.
Line 28, change "an insitute user" to -- an institute user --.
Line 34, change "be retreived" to -- be retrieved --.
Line 48, change "wherein learning" to -- wherein the learning --.
Line 63, change "the material" to -- the materials --.

UNITED STATES PATENT AND TRADEMARK OFFICE
CERTIFICATE OF CORRECTION

PATENT NO.   : 6,398,556 B1
DATED        : June 4, 2002
INVENTOR(S)  : Ho et al.

It is certified that error appears in the above-identified patent and that said Letters Patent is hereby corrected as shown below:

<u>Column 18,</u>
Line 39, change "learning methos" to -- learning method --.

<u>Column 19,</u>
Line 14, change "that institute user" to -- that learning user --.
Line 28, change "the user" to -- the institute user --.

Signed and Sealed this

Twelfth Day of November, 2002

Attest:

JAMES E. ROGAN
*Attesting Officer*   *Director of the United States Patent and Trademark Office*

(12) EX PARTE REEXAMINATION CERTIFICATE (5779th)
United States Patent
Ho et al.

(10) Number: US 6,398,556 C1
(45) Certificate Issued: Jun. 12, 2007

(54) INEXPENSIVE COMPUTER-AIDED LEARNING METHODS AND APPARATUS FOR LEARNERS

(76) Inventors: Chi Fai Ho, 965 Astoria Dr., Sunnyvale, CA (US) 94087; John P. Del Favero, Jr., 223 O'Keefe St., Menlo Park, CA (US) 94025; Peter P. Tong, 1807 Limetree La., Mountain View, CA (US) 94040

Reexamination Request:
   No. 90/006,915, Aug. 25, 2003

Reexamination Certificate for:
   Patent No.: 6,398,556
   Issued: Jun. 4, 2002
   Appl. No.: 09/290,770
   Filed: Apr. 13, 1999

Certificate of Correction issued Nov. 12, 2002.

Related U.S. Application Data

(63) Continuation-in-part of application No. 09/110,569, filed on Jul. 6, 1998, now Pat. No. 6,126,448, and a continuation-in-part of application No. 09/273,392, filed on Mar. 22, 1999, now Pat. No. 6,213,780.

(51) Int. Cl.
   *G09B 19/00* (2006.01)

(52) U.S. Cl. .................. 434/219; 434/118; 434/350; 706/927; 707/104; 708/131

(58) Field of Classification Search ............... 434/219, 434/323, 118, 350; 705/11
   See application file for complete search history.

(56) References Cited

U.S. PATENT DOCUMENTS

| | | | |
|---|---|---|---|
| 4,006,539 A | 2/1977 | Slomski | 434/258 |
| 4,867,685 A * | 9/1989 | Brush et al. | 434/234 |
| 5,002,491 A | 3/1991 | Abrahamson et al. | |
| 5,029,081 A | 7/1991 | Kagawa | |
| 5,099,431 A | 3/1992 | Natarajan | |
| 5,164,897 A | 11/1992 | Clark et al. | |
| 5,176,520 A | 1/1993 | Hamilton | |
| 5,224,173 A | 6/1993 | Kuhns et al. | |
| 5,251,294 A | 10/1993 | Abelow | |
| 5,255,347 A | 10/1993 | Matsuba et al. | 706/25 |
| 5,302,132 A | 4/1994 | Corder | |
| 5,306,878 A | 4/1994 | Kubo | 187/380 |
| 5,370,399 A | 12/1994 | Liverance | 463/23 |
| 5,387,104 A | 2/1995 | Corder | |
| 5,416,694 A | 5/1995 | Parish et al. | |
| 5,458,494 A | 10/1995 | Krohn et al. | |

(Continued)

FOREIGN PATENT DOCUMENTS

WO    WO 98/30965    7/1998

OTHER PUBLICATIONS

PLM (Plato Learning Management).
Navy CMI System, pp. 1–12.
Centra Announces Strategic Alliances to lead industry shift toward comprehensive live web-based training delivery, Centra Software, Feb. 10, 1997, pp. 1–3.

(Continued)

*Primary Examiner*—Kathleen Mosser

(57) ABSTRACT

A computer-aided learning method and apparatus for a learning user to learn materials inexpensively. Not only does the apparatus provide the user the freedom as to where and when to learn, and the guidance as to what to learn, the apparatus also reduces a significant hurdle to learning—Tuition. The apparatus retrieves a user identifier entered by the user, and determines whether the user is a learning user or an institute user. If the user is a learning user, the apparatus allows the user to access information regarding learning materials. If the user is an institute user, the apparatus permits the user to access information regarding at least one learning user. The institute user might be interested to use the apparatus to recruit employees to fill job openings. A learning user pays significantly less than an institute user to access information, so as to encourage the learning user to work on learning materials. The apparatus can also track and update information regarding the users.

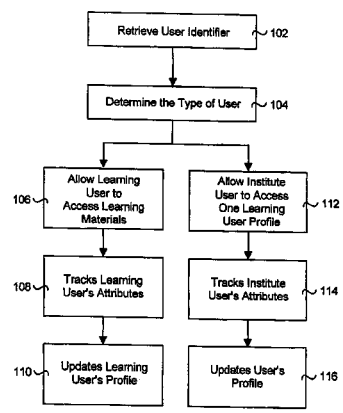

U.S. PATENT DOCUMENTS

| | | | |
|---|---|---|---|
| 5,506,984 A | | 4/1996 | Miller |
| 5,577,919 A | | 11/1996 | Collins et al. .............. 434/322 |
| 5,592,375 A | | 1/1997 | Salmon et al. |
| 5,618,182 A | | 4/1997 | Thomas |
| 5,692,906 A | | 12/1997 | Corder |
| 5,758,079 A | | 5/1998 | Ludwig et al. ............. 709/204 |
| 5,767,897 A | | 6/1998 | Howell ........................ 348/15 |
| 5,788,504 A | | 8/1998 | Rice et al. |
| 5,799,292 A | | 8/1998 | Hekmatpour |
| 5,809,493 A | | 9/1998 | Ahamed et al. .............. 706/52 |
| 5,823,781 A | * | 10/1998 | Hitchcock et al. .......... 434/118 |
| 5,832,497 A | | 11/1998 | Taylor |
| 5,867,799 A | | 2/1999 | Lang et al. |
| 5,879,165 A | | 3/1999 | Brunkow et al. |
| 5,896,128 A | | 4/1999 | Boyer ........................ 715/716 |
| 5,907,831 A | * | 5/1999 | Lotvin et al. ................. 705/14 |
| 5,978,768 A | | 11/1999 | McGovern et al. |
| 5,999,908 A | | 12/1999 | Abelow |
| 6,033,226 A | * | 3/2000 | Bullen ........................ 434/219 |
| 6,053,739 A | | 4/2000 | Stewart et al. .............. 434/236 |
| 6,077,085 A | | 6/2000 | Parry et al. ................. 434/322 |
| 6,141,529 A | | 10/2000 | Remschel ................... 434/350 |
| 6,186,794 B1 | | 2/2001 | Brown et al. ............... 434/116 |
| 6,292,830 B1 | | 9/2001 | Taylor et al. ............... 709/201 |
| 6,396,954 B1 | | 5/2002 | Kondo ........................ 382/224 |
| 6,471,521 B1 | | 10/2002 | Dornbush et al. .......... 434/322 |
| 2001/0037376 A1 | | 11/2001 | Ullman et al. |

OTHER PUBLICATIONS

Centra Software ships Symposium 1.0, Centra Software, Jul. 14, 1997, pp. 1–3.

Plaut Consulting Selects Centra's Symposium to deliver live interactive training to SAP R/3 users via the Internet, Centra Software, Aug. 12, 1997, pp. 1–3.

Centra Software announces strategic partnership with Macromedia to support open standards for enterprise learning, Centra Software, Oct. 8, 1997, pp. 1–3.

An online prescription for basic skills, by Lois S. Wilson, Training & Development Journal, Apr. 1990, pp. 36–41.

Calos: An experiment with computer–aided learning for operating systems, Murray W. Goldberg, SiGCSE, Feb. 1996, pp. 175, 177,179.

WebCT and first year: student reaction to and use of a web–based resource in first year computer science, Murray W. Goldberg, ITiCSE, 1997, pp. 127, 129.

An update on WebCT (World–Wide–Web course tools) a tool for the creation of sophisticated web–based learning environments, Goldberg et al., Proceedings of NAUWeb '97—Current Practices in Web–Base Course Development, Jun. 12–15, 1997, pp. 1–8.

Welcome! Getting started with WebCT, last modified Sep. 16, 1997, http://www.eduworks.com/victor/New%20Prior%20Art/WebCT/Getting%20Started%20w..., downloaded Feb. 17, 2005, pp. 1–10.

Online educational delivery applications/Tools for WebCT, last updated Aug. 26, 1997, http://www.eduworks.com/victor/New%20Prior%20Art/WebCT/On–Line%20Educational..., downloaded Feb. 17, 2005, pp. 1–4.

General Overview, last modified Jul. 13, 1997, http://www.eduworks.com/victor/New%20Prior%20Art/QuestWriter/GenOver.h..., downloaded Feb. 15, 2005, pp. 1–3.

QuestWriter Features, last modified Aug. 12, 1997, http://www.eduworks.com/vicotr/New%20Prior%20Art/QuestWriter/QWfeatures.htm, downloaded Feb. 17, 2005, pp. 1–12.

Professor's Overview, last modified Jul. 13, 1997, http://www.eduworks.com/victor/New%20Prior%20Art/QuestWriter/ProOver.htm, downloaded Feb. 17, 2005, pp. 1–4.

Student's Overview, last modified Jul. 13, 1997, http://www.eduworks.com/victor/New%20Prior%20Art/QuestWriter/StuOver.htm, downloaded Feb. 17, 2005, pp. 1–4.

Programmer's Overview, last modified Jul. 13, 1997, http://www.eudworks.com/victor/New%20Prior%20Art/QuestWriter/ProgOver..., downloaded Feb. 15, 2005, p. 1.

List of QuestWriter Files, last modified Jul. 14, 1997, http://www.eduworks.com/victor/New%20Prior%20Art/QuestWriter/file_list.htm, downloaded Feb. 15, 2005, pp. 1–4.

Quiz Application, last modified Jul. 13, 1997, http://www.eduworks.com/victor/New%20Prior%20Art/QuestWriter/quizapp.htm, downloaded Feb. 17, 2005, pp. 1–3.

Class Gradebook, last modified Jul. 14, 1997, http://www.eduworks.com/victor/New%20Prior%20Art/QuestWriter/cgrade.htm, downloaded Feb. 15, 2005, pp. 1–7.

Conditional Links, last modified Jul. 14, 1997, http://www.eduworks.com/victor/New%20Prior%20Art/QuestWriter/clink.htm, downloaded Feb. 15, 2005, pp. 1–4.

The Registration Page, last modified Jul. 14, 1997, http://www.eduworks.com/victor/New%20Prior%20Art/QuestWriter/registration.htm, downloaded Feb. 17, 2005, pp. 1–4.

Class Library, last modified Jul. 13, 1997, http://www.eduworks.com/victor/New%20Prior%20Art/QuestWriter/class-lib.htm, downloaded Feb. 17, 2005, pp. 1–2.

QuestWriter System Page, http://www.eduworks.com/victor/New%20Prior%20Art/QuestWriter/QuestWriter%20Syste..., downloaded Feb. 17, 2005, p. 1.

QuestWriter Mailing list Documentation, http://www.eduworks.com/victor/New%20Prior%20Art/QuestWriter/Mailing%2..., downloaded Feb. 15, 2005, p. 1.

Administrator's Overview, last modified Jul. 13, 1997, http://www.eduworks.com/victor/New%20Prior%20Art/QuestWriter/AdOver.htm, downloaded Feb. 17, 2005, pp. 1–2.

QW admin Documentation, http://www.eduworks.com/victor/New%20Prior%20Art/QuestWriter/QW%20admin%D..., downloaded Feb. 17, 2005, pp. 1–2.

Glimpse–Http Documentation, http://www.eduworks.com/victor/New%20Prior%20 Art/QuestWriter/Glimpse–H..., downloaded Feb. 15, 2005, pp. 1–2.

List of Classes, copyright 1996, http://www.eduworks.com/victor/New%20Prior%20Art/QuestWriter/QuestWriter%20Clas..., downloaded Feb. 17, 2005, pp. 1–4.

IQ mailing lists requests, http://www.eduworks.com/victor/New%20Prior%20Art/QuestWriter/IQ%20mai..., downloaded Feb. 15, 2005, p. 1.

InterQuest Home Page, last modified Jul. 13, 1997, http://www.eduworks.com/victor/New%20Prior%20Art/QuestWriter/IQHome.htm, downloaded Feb. 15, 2005, pp. 1–2.

Welcome to CalculusQuest, last modified Sep. 24, 1997, http://www.eduworks.com/victor/New%20Prior%20Art/QuestWriter/CalculusQ..., downloaded Feb. 15, 2005, p. 1.

CalculusQuest Technological Infrastructure, http://www.eduworks.com/victor/New%20Prior%20Art/QuestWriter/Technological%20In..., downloaded Feb. 17, 2005, p. 1.

CalculusQuest Features, http://www.eduworks.com/victor/New%20Prior%20Art/QuestWriter/Features.h..., downloaded Feb. 15, 2005, p. 1.

CalculusQuest Pedagogical Principles, http://www.eduworks.com/victor/New%20Prior%20Art/QuestWriter/Pedagogic..., downloaded Feb. 15, 2005, p. 1.

Objectives, http://www.eduworks.com/victor/New%20Prior%20Art/QuestWriter/CQ-Object..., downloaded Feb. 15, 2005, p. 1-2.

HyperNews Documentation, http://www.eduworks.com/victor/New%20Prior%20Art/QuestWriter/HyperNew..., downloaded Feb. 15, 2005, p. 1.

Welcome to HyperNews, http://www.eduworks.com/victor/New%20Prior%20Art/QuestWriter/HyperNew..., downloaded Feb. 15, 2005, p. 1-6.

Overview, last modified Jul. 14, 1997, http://www.eduworks.com/victor/New%20Prior%20Art/QuestWriter/viewlog.htm, downloaded Feb. 17, 2005, pp. 1-7.

Permissions, last modified Jul. 14, 1997, http://www.eduworks.com/victor/New%20Prior%20Art/QuestWriter/permissio..., downloaded Feb. 15, 2005, p. 1.

QuestWriter History & Future, last modified Aug. 12, 1997, http://www.eduworks.com/victor/New%20Prior%20Art/QuestWriter/history.htm, downloaded Feb. 15, 2005.p. 1-2.

The Massgrade Tool, last modified Jul. 14, 1997, http://www.eduworks.com/victor/New%20Prior%20Art/QuestWriter/massgrade.htm, downloaded Feb. 17, 2005, p. 1.

QuestWriter Installation, last modified Aug. 12, 1997, http://www.eduworks.com/victor/New%20Prior%20Art/QuestWriter/install.htm, downloaded Feb. 15, 2005, pp. 1-3.

Real Audio Documentation, http://www.eduworks.com/victor/New%20Prior%Art/QuestWriter/Real%20Audio%20..., downloaded Feb. 17, 2005, p. 1.

Instructions for the Stage 7 Communication Activity, copyright 1996, 1989, http://www.eduworks.com/victor/New%20Prior%20Art/QuestWriter/Example%20from%, downloaded Feb. 17, 2005, pp. 1-2.

Communication Activity #5001, copyright 1996, 1989, http://www.eduworks.com/victor/New%20Prior%20Art/QuestWriter/Typical%20results%, downloaded Feb. 17, 2005, pp. 1-3.

New padagogies and tools for web based calculus, Proceedings of the AACE WebNet96 conference, By Bogley et al., Oct. 15-19, 1996, pp. 1-8.

Pedagogic innovation in web-based instruction, Bogley et al., http://www.eduworks.com/victor/New%20Prior%20Art/QuestWriter/PEDOGOG..., downloaded Feb. 15, 2005, pp. 1-5.

Evaluating Web-based virtual courses: research results and implications, by Scott Chadwick, Distance Education: Designing for success conference—Seattle, Washington, Apr. 1997, pp. 1-4.

Enhancing teaching using the Internet: report of the working group on the World Wide Web as an interactive teaching resource, By Hartley et al., Integrating Tech. into C.S.E., Jun. 1996, pp. 218-228.

Adoption and use of a computer-mediated communication system by contact north site coordinators, By Sweet et al., Journal of Distance Education 1991, pp. 1-10.

Educational MUDs, MOOs, and MUSEs, By Odvard Egil Dyrli, Technology & Learning May/Jun. 1996, p. 20.

The tutor language, Bruce Arne Sherwood, 1977.

ILINC Executive Briefing, Shrinking distances, improving results. Distance learning with LearnLinc I-Net, By Wilson et al. copyright 1997, http://www.eduworks.com/victor/PICs_Final/Documentation/LearnLinc/ILINC_Executive..., downloaded Feb. 17, 2005, pp. 1-6.

LearnLinc LAN/WAN—the first virtual classroom, By Interactive Learning International Corporation, copyright 1997, http://www.eduworks.com/victor/PICs_Final/Documentation/LearnLinc/LearnLin_LAN-..., downloaded Feb. 17, 2005, pp. 1-3.

LearnLinc is based on proven interactive learning methodology, By Interactive Leaning International Corporation, copyright 1997, http://www.eduworks.com/victor/PICs_Final/Documentation/LearnLinc/LearnLink_files/..., downloaded Feb. 17, 2005, pp. 1-3.

LearnLinc Pro-Net. The Internet virtual classroom with seamless videoconferencing, By Interactive Learning International Corporation, copyright 1997, http://www.eduworks.com/victor/PICs_Final/Documentation/LearnLinc/LearnLinc_Pro-N..., downloaded Feb. 17, 2005, pp. 1-3.

Educational applications of computer conferencing, Linda Harasim, Journal of Distance Education, 1986, pp. 1-9.

Using Computes in Human Resources: How to Select and Make the Best Use of Automated HR Systems, by Forrer et al., Jossey-Bass Publishers, San Francisco, 1991.

OnTrack for training: About OnTrack for Training, DKSystems, http://web.archive.org/web/19980203182100/www.dksystems.com/ps-ot-ot.html downloaded Oct. 24, 2004.

OnTrack for training: Features and benefits, DKSystems, http://web.archive.org/web/19980203183824/www.dksystems.com/ps-ot-ot-features.html, downloaded Oct. 24, 2004, pp. 1-3.

OnTrack for training: Technical Specifications, DKSystems, http://web.archive.org/web/19980203183837/www.dksystems.com/ps-ot-ot-specs.html, downloaded Oct. 24, 2004, pp. 1-3.

OnTrack-ATM: About OnTrack-ATM, DKSystems, http://web.archive.org/web/19980203182113/www.dksystems.com/ps-ot-ot-atm.html, downloaded Oct. 24, 2004, pp. 1-2.

OnTrack-ATM.Net: About OnTrack-Net, DKSystems, http://web.archive.org/web/19980203182011/www.dksystems.com/ps-ot-atmnet.html, downloaded Oct. 24, 2004, p. 1.

OnTrack-ATM.Net: Features and benefits, DKSystems, http://web.archive.org/web/19980203182029/www.dksystems.com/ps-ot-atmnet-features..., downloaded Oct. 24, 2004, p. 1-2.

OnTrack-ATM.Net: Technical Specifications, DKSystems, http://web.archive.org/web/19980203182042/www.dksystems.com/ps-ot-atmnet-specs.html, downloaded Oct. 24, 2004, p. 1-2.

OnTrack-ATM.Net: Technical Specifications—Configuration Module, DKSystems, http://web.archive.org/web/19980203182141/www.dksystems.com/ps-ot-atmnet-specs-co..., downloaded Oct. 24, 2004, p. 1-3.

OnTrack–ATM.Net: Technical Specifications—Server Module, DKSystems, http://web.archive.org/web/19980203182204/www.dksystems.com/ps–ot–atmnet–specs–se..., downloaded Oct. 24, 2004, 2 pages.

OnTrack–ATM.Net: Frequently Asked Questions (FAQs), DKSystems, http://web.archive.org/web/19980203180950/www.dksystems.com/ps–ot–atmnet–faqs.html, downloaded Oct. 24, 2004, p. 1–7.

About Us—Our clients: DKSystems, http://web.archive.org/web/19980203182809/www.dksystems.com/tour–about–client.html, downloaded Oct. 24, 2004, p. 1–2.

DKSystems announces OnTrack for Training API—Allows real–time integration of CBT software with OnTrack for Training By DKSystems, Sep. 26, 1997, pp. 1–2.

Technical Support: OnTrack for Training Service Pack: SP–02/98, DKSystems, http://web.archive.org/web/19980203183622/www.dksystems.com/supt–technical–svc–pac..., downloaded Oct. 24, 2004, p. 1–4.

Technical Support: Glossary, DKSystems, http://web.archive.org/web/19980203182331/www.dksystems.com/supt–technical–glossar..., downloaded Oct. 24, 2004, 31 pages.

Consulting: About DKConsulting services, DKSystems, http://web.archive.org/web/19980203183527/www.dksystems.com/ps–pr–cs.html, downloaded Oct. 24, 2004, p. 1–2.

An evaluation of computer managed instruction in navy technical training,Carson et al., Navy Personnel Research and Development Center, Jun. 1975, pp. v–x, 1–67, 70–81.

Integrated system test of the advanced instructional system, Larry M. Lintz, Air Force Human Resources Laboratory, Dec. 1979, pp. 1–103.

Computer–managed instruction in the navy: I. Research background and status, By Nick Van Matre, Navy Personnel Research and Development Center, Sep. 1980, (p. iii, v, vii, 1–12, A0–A5).

Ingenium, Skill–Driven Training Management Software, Meliora Systems, Inc., last updated Mar. 1, 1997, http://www.eduworks.com/victor/PICs_Final/Documentation/Ingenium/ingeniu..., downloaded Feb. 18, 2005, pp. 1–3.

Ingenium press release, Meliora Systems Inc., Dec. 20, 1996, pp. 1–4.

Ingenium Training, Meliora Systems, Inc., last updated Sep. 12, 1997, http://www.eduworks.com/victor/PICs_Final/Documentation/Ingenium/Ingenium 3 Oct..., downloaded Mar. 25, 2005, pp. 1–2.

Ingenium: A family of skill–driven training management products. 1997–1998, http://www.eduworks.com/victor/PICs_Final/Documentation/Ingenium/Ingenium_3_Oct_..., downloaded Mar. 25, 2005, pp. 1–6.

Frequently asked questions about the product, Meliora Systems, Inc., last updated Sep. 10, 1997, http://www.eduworks.com/victor/PICS_Final/Documentation/Ingenium/Ingenium_3_Oct_..., downloaded Mar. 25, 2005, pp. 1–3.

Technical Specifications, Meliora Systems, Inc., last updated Sep. 10, 1997, http://www.eduworks.com/victor/PICS_Final/Documentation/Ingenium/Ingenium_3_Oct_..., downloaded Mar. 25, 2005, pp. 1–3.

Ingenium 3.0 Features and Functionality, Meliora Systems, Inc., last updated Sep. 5, 1997, http://www.eduworks.com/victor/PICS_Final/Documentation/Ingenium_3_Oct_..., downloaded Mar. 25, 2005, pp. 1–2.

Announcing Ingenium Messenger! last modified Mar. 1, 1997. Meliora Systems, http://www.eduworks.com/victor/PICs_Final/Documentation/Ingenium/ingenium_page_A..., downloaded Mar. 25, 2005, pp. 1–2.

Ingenium client/server, http://www.eduworks.com/victor/PICs_Final/Documentation/Ingenium/Ingenium_3_Oct_..., downloaded Mar. 25, 2005, p. 1.

New software uses latest technology popularity of the Web to take the 'trauma' out of training management, Meliora Systems, http://www.eduworks.com/victor/PICs_Final/Documentation/Ingenium/Ingenium_3_Oct_..., downloaded Mar. 25, 2005, pp. 1–3.

Ingenium Web connect technical requirements, http://www.eduworks.com/victor/PICs_Final/Documentation/Ingenium/Ingenium_3_Oct_..., downloaded Mar. 25, 2005, p. 1.

New product, http://www.eduworks.com/victor/PICs_Final/Documentation/Ingenium/Ingenium_3_Oct_..., downloaded Mar. 25, 2005, p. 1.

Release 3.0 Pricing, Meliora Systems, http://www.eduworks.com/victor/PICs_Final/Documentation/Ingenium/Ingenium_3_Oct_..., downloaded Mar. 25, 2005, 2 pages.

Skil–Trak for Windows, Meliora Systems, Inc., 47 slides.

New features for Ingenium 2.0, 10 pages.

The INGENIUM Informer, Meliora Systems, The Intelligent Training Management Newsletter, vol. II, No. 2, Spring 1995.

Ingenium Conceptual Terms, Meliora Systems, Inc., 3 pages.

Ingenium Sample learning experiences, Meliora Systems, Inc., 1 page.

Ingenium Student/group membership, Meliora Systems, Inc., 1 page.

Ingenium Facilities & resource management, Meliora Systems, Inc., 1 page.

Ingenium Skills required by group membership, Meliora Systems, Inc., 1 page.

Ingenium Skills & Training required by group membership, Meliora Systems, Inc. 2 pages.

Ingenium Development plan requirements gap, Meliora Systems, Inc., 1 page.

Ingenium Using rules in the development plan, Meliora Systems, Inc., 14 pages.

Ingenium Future Product Divisions, Meliora Systems, Inc., 52 pages.

Attributes Resume, Meliora Systems, Inc., 3 pages.

Attribute Gap Analysis, Meliora Systems, Inc., 4 pages.

Learning Solutions Catalog, Meliora Systems, Inc., 2 pages.

Learning Solutions Catalog Exceptions, Meliora Systems, Inc., 1 page.

Attribute Inventory Aging by Coach, Meliora Systems, Inc., 1 page.

Attribute Inventory Aging by Highest Percentage 0–90 Days, Meliora Systems, Inc., 1 page.

Attribute Inventory Aging by Employee, Meliora Systems, Inc., 1 page.

MRP Support Doc, Meliora Systems, Inc., 4 pages.

Organization Attribute Summary, Meliora Systems, Inc., 1 page.

Consistency Report by Manager, Meliora Systems, Inc., 1 page.

Consistency Report All IM, Meliora Systems, Inc., 1 page.
Employee List (Alphabetically), Meliora Systems, Inc., 1 page.
Job/Organization Attribute Summary, Meliora Systems, Inc., 4 pages.
Sheet 1, 3 pages.
Flowchart, 1 page.
Ingenium SQL Server Testing Plan, 4 pages.
Teaching through case–based reasoning: an ITS engine applied to business communication, Papagni et al. Proceedings of AI–ED 97 World Conference on Artificial Intelligence in Education,1997,p. 111–118.
Phoenix product overview & quick reference guide, Legent, 6 pages (3rd page has copyright date 1993).
Phoenix for Windows, Pathlore Software Corp, copyright 1996, http://www.eduworks.com/victor/PICs_Final/Documentation/Pathlore_July_1997/Phoenix..., downloaded Feb. 17, 2005, pp. 1–3.
Pathlore releases Phoenix Internet and Intranet, Pathlore Software Corporation, Feb. 10, 1997.
Human resource management systems: strategies, tactics and techniques, Ceriello et al., Copyright 1991.
Automate HR Tasks, Training & Development, Oct. 1996, pp. 71–72.
The world's most advanced training management software, Syscom, Inc., copyright 1997, http://www.eduworks.com/victor/PICs_Final/Documentation/TrainingServer_July_1007/ts..., downloaded Feb. 17, 2005, pp. 1–2.
Quick Tour, Syscom, Inc., copyright 1997, http://www.eduworks.com/victor/PICs_Final/Documentation/TrainingServer_July_1997/to..., downloaded Feb. 17, 2005, pp. 1–2.
Customer support, http://www.eduworks.com/victor/PICs_Final/Documentation/TrainingServer_July_1997/s..., downloaded Feb. 17, 2005, pp. 1–2.
Success Stories, http://www.eduworks.com/victor/PICs_Final/Documentation/TrainingServer_July_1997/s..., downloaded Feb. 17, 2005, pp. 1–4.
Technical Specifications, http://www.eduworks.com/victor/PICs_Final/Documentation/TrainingServer_July_1997/te..., downloaded Feb. 17, 2005.
Comprehensive features, Syscom, Inc., copyrgiht 1997 http://www.eduworks.com/victor/PICs_Final/Documentation/TrainingServer_July_1997/fe..., downloaded Feb. 17, 2005, pp. 1–2.
Overview & Brochure, http://www.eduworks.com/victor/PICs_Final/Documentation/TrainingServer_July_1997/b..., downloaded Feb. 17, 2005, pp. 1–2.
Universal Self–Service Access, Syscom, Inc., copyright, 1997, http://www.eduworks.com/victor/PICs_Final/Documentation/TrainingServer_July_1997/T..., downloaded Feb. 17, 2005, pp. 1–2.
Training TeleServer, http://www.eduworks.com/victor/PICs_Final/Documentation/TrainingServer_July_1997/te..., downloaded Feb. 17, 2005, pp. 1–3.
TrainingServer [employee detail], http://www.eduworks.com/victor/PICs_Final/Documentation/TrainingServer_July_1997/self–scr.gif, downloaded Feb. 17, 2005, p. 1.
TrainingServer—[Administrative Documents], http://www.eduworks.com/victor/PICs_Final/Documentation/TrainingServer_July_1997/doc–scr.gif, downloaded Feb. 17, 2005, p. 1.
TrainingServer—[Employee Internal Transcripts], http://www.eduworks.com/victor/PICs_Final/Documentation/TrainingServer_July_1997/trans–scr.gif, downloaded Feb. 17, 2005, p. 1.
TrainingServer—[Employee Skills], http://www.eduworks.com/victor/PICs_Final/Documentation/TrainingServer_July_1997/skil–scr.gif, downloaded Feb. 17, 2005, p. 1.
TrainingServer—[Employee Job Qualifications/Gap Analysis], http://www.eduworks.com/victor/PICs_Final/Documentation/TrainingServer_July_1997/gap–scr.gif, downloaded Feb. 17, 2005, p. 1.
Event Director—[Schedule of Classes], http://www.eduworks.com/victor/PICs_Final/Documentation/TrainingServer_July_1997/sch–scr.gif, downloaded Feb. 17, 2005, p. 1.
Training Architect—[Course Catalog], http://www.eduworks.com/victor/PICs_Final/Documentation/TrainingServer_July_1997/cat–scr.gif, downloaded Feb. 17, 2005, p. 1.
Partner Directory, http://www.eduworks.com/victor/PICs_Final/Documentation/TrainingServer_July_1997/p..., downloaded Feb. 17, 2005, p. 1.
Forum Business Overview, http://www.eduworks.com/victor/PICs_Final/Documentation/TrainingServer_July_1997/f..., downloaded Feb. 17, 2005, pp. 1–3.
Personal Computers for Education, Alfred Bork, Harper & Row.
Computerized adaptive testing: a primer, Howard Wainer, Lawrence Erlbaum Associates, Publishers, 1990.
From computer–assisted instruction to intelligent tutoring systems, Norman Livergood, JL of Artificial intelligence in education, vol. 2(3) Spring 1991, pp. 39–50.
Question Mark Professional User Manual, Question Mark Computing Ltd., 1993, pp. Title page, i–vii, 1–75 (section 1 to 5.8.3), 149–277 (section 6 to 10.5), 149–183 (section 8 to 9.3), 209–240 (section 10 to 11.2.3), 264–324 (section 12 to appendix B4), 311–346 (appendix C to end of index).
Computer aided instruction for statistics: A knowledge–based systems approach, Prabhu et al., IJCAET vol. 5 No. 1 1995, pp. 3–14.
Cliffs StudyWare, copyright 1993.
Pathway and Pathmaker, Solis, 30 pages, pp. 1–5.
SMART Evaluation: Cognitive Diagnosis, Mastery Learning & Remediation, Valerie Shute, one page (p. 123).
MasteryPOINT Learning Systems Handbook, Applied Learning Systems, Inc., pp. Title page, table of contents, 1–5, 15, 19–28 and 12 other pages with no page numbers.
MasterPOINT Website Design Parameters,pp. 1–10, 7 pages of text and 2 pages of emails.
Scholar/Teach 3, Version 3.1, Users Guide for the IBM–PC, Boeing Computer Services, 1986. (plus 5 pages at the front).
TIMS, A testing information and management system, Chris Daily, pp. 16–18.
"Computer based training—a report of a NATO study visit to America. A.P. Report 91" by Patrick, pp. 1–29, Jan. 1980.
"Improving the Selection, classification, and utilization of army enlisted personnel: Annual Report synopsis, 1984 Fiscal Year" Human Resources Research Organization, Alexandria, Va., pp. v, vii–x, and 1–40, Jul. 1985.
"Mendel: An Intelligent Computer Tutoring System For Genetics Problem–Solving, Conjecturing, and Understanding" by Streibel et al., Machine–Mediated Learning, vol. 2, No. 1 & 2, pp. 129–159, 1987.

"Getting Serious about SAT software" by Harvey et al., National Council of Teachers of Mathematics, pp. 440–454, Sep. 1987.

"Control for Intelligent Tutoring Systems: A Comparison of Blackboard Architectures and Discourse Management Networks" by W. Murray. Machine–Mediated Learning, vol. 3, No. 1, pp. 107–124, 1989.

"Taking a standardized test? Here's some help." by M. Bunescu, 62 Electronic Learning, pp. 62–64, Sep. 1989.

"ECAL: Bridging the gap between CAL and Intelligent tutoring systems" by Elsom–Cook et al., Computers & Education, vol. 15, No. 1–3, pp. 69–81, 1990.

"A blackboard–based dynamic instructional planner" by W. Murray, Artificial Intelligence Center, FMC Corp., ONR–6376, pp. 1–59, 72–83, 97–103, with 9 introductory pages, Feb. 1990.

Test–taking skills. School library journal, pp. 61, May 1990.

"An architecture and methodology for creating a domain–independent, plan–based intelligent tutoring system" by J. Vassileva., Educational & Training Technology International, vol. 27, #4, pp. 386–397, Nov. 1990.

"Software" by Weiser el al., Media & methods, pp. 63–64, Nov.–Dec. 1990.

"Toward the design of an intelligent courseware production system using software engineering and instructional design principles." By Chen et al. Educational Technology Systems, pp. 41–52, Dec. 1990.

"Advanced technology training program for the apparel industry. Final report." Office of vocational and adult education (ED), Washington, DC, pp. 1–9, 1991.

"An analysis of computer–assisted instruction on scholastic aptitude test performance of rural high school students." By Fine et al. Education, vol. 111, No. 3, p. 400–403, Spring/91.

"Building integrated skills—a model for action." BC Construction industry skills improvement council, 404–737 Carnarvon Street, New Westminster, British Columbia V3M 5X1, pp. 1–6, Aug. 1991.

"Computer software." By Herne et al. Journal of Reading 3517, pp. 604, Apr. 1992.

"Designing a Tool Supporting the Development of ITS in Different Domains: The Docet Experience." By Bonarini et al., Interactive Learning Environments vol. 3, No. 2, pp. 131–149, 1993.

"Databases on vocational qualifications and courses accredited" European centre for the development of vocational training, Berlin (Germany), pp. 1–11, Feb. 1993.

"An approach to developing intelligent tutors in Mathematics" by H. Nwana, Computers & Education, vol. 20, No. 1, pp. 27–43, Mar. 1993.

"CBT Wintracs," CBT Systems Ltd., pp. 3–47, 1994.

"An historical perspective and a model for evaluation of intelligent tutoring systems." By Seidel et al. J. Educational Computing Research, vol. 10(2), pp. 103–128, 1994.

"A new direction for developmental education using technology." Annual convention of the American association of community colleges (74$^{th}$, Washington, DC, Apr. 6–9, 1994) pp. 1–9, Apr. 1994.

"Mathematics study skills: A must for students with LD." By P. Nolting. Intervention in school and clinic, vol. 30, #1, pp. 53–59, Sep. 1994.

"Keeping up with the SATs." By R. Schneider. Technology and learning, pp. 7–9, Sep. 1994.

"Using computer technology to monitor student progress and remediate reading problems." By C. McCullough. School psychology review, vol. 24, No. 3, pp. 426–439, 1995.

"Software and Courseware" The Technological Horizons in Education Journal vol. 22, No. 10, p. 41, May 1995.

"Gearing up for the SAT." By R. Schneider. Technology Learning, pp. 9–11, Jan. 1996.

"Basic Skills Program Helps Trainees Pass Vocational Tests" The Technological Horizons in Education Journal vol. 23, No. 8, p. 66, Mar. 1996.

"Foundations of Probability with applications," selected papers 1974–1975. pp. 149–188. By Suppes et al., Nov. 1996.

"SAT preparation through technology." By Bean et al. Media & Methods, p. 73, Nov.–Dec. 1996.

"Computers in school: A loser? Or a lost opportunity?" By Shao et al. Business Week, No. 3115, p. 108, Jul. 17, 1989.

"Is it a 'miracle'? Computer teaches piano" Consumer reports, v. 56, No. 11, p. 718, Nov. 1991.

"Kids love to learn with these PC games" By Warner et al. Business week, No. 3265, p. 116, May 11, 1992.

"Software that's fun and educational—that's 'edutainment'" By C. Miller. American marketing association, Marketing News, p. 2, Apr. 26, 1993.

"Test drive; comic relief helps navigate hallways of 'Inside the SAT'" By E. Graner. St Louis Post–Dispatch, Everyday magazine, p. 1F, Mar. 8, 1995.

"SAT fundamentals" By D. Oldenburg. The Washington Post, p. D05, Final Edition, Apr. 7, 1995.

"SAT Software: Does it work?" By R. Calem. The New York Times, Section C, p. 2, col. 1, Late Edition—Final, Apr. 27, 1995.

"Software spells out the ABC's of SAT" By R. Calem. The Tampa Tribune, Baylife, p. 1, Final edition, May 3, 1995.

"CD–ROM helps prepare for SAT" By J. Gaw. The Plain Dealer, Next, p. 1E, Final, May 8, 1995.

"Kaplan preps for CD–ROM release" HFN, vol. 69, No. 32, p. 67, Aug. 7, 1995.

"Turning SATs into a kind of video game." By M. Putzel. The Boston Globe, Economy, p. 91, City Edition, Sep. 15, 1995.

"Training the workers who operate the trains." By Butt et al. American Society for Training & Development, Inc., Technical & Skills training, vol. 6, No. 7, p. 14–19, Oct. 1995.

"Computer tutors to help you ace the SAT." By Dunkin et al. Business Week, Personal business, education, No. 3444, p. 142, Oct. 2, 1995.

"New CD–ROMs aimed at reducing SAT jitters" By W. Honan. The Houston Chronicle, section a, p. 6, 2 Star Edition, Oct. 8, 1995.

"Test–preparation software scores big." By V. Marion. Los Angeles Times, Business section, part D, p. 7, financial desk, Orange County Edition, Nov. 1, 1995.

"Multiple choice: Virtual tutors ratedcoaching options range from staid help to high–tech glitz", Gannett Company, Inc., USA Today, Mar. 21, 1996, Final Edition, Life Section. p. 6D, Mar. 21, 1996.

Computer–assisted instruction at Stanford, 1966–68 By Suppes et al, Academic Press, pp. v–ix and 1–533, 1972.

Control Data Plato, System Overview by Control Data Corporation, 1976.

Control Data Plato CMI Author's Guide By Control Data Corporation, 1978.

Control Data Plato, Author Language Reference Manual By Control Data Corporation, Apr. 1978.
CDC Philosophy By Control Data Corporation, 1978.
A computerized model for placement and diagnostic testing in college remedial mathematics, A Florida Atlantic University Dissertation by Iraj Hirmanpour, pp. i–vii and 1–163, Dec. 1980.
Industry Education Computer Based Training Strategy By Arthur Andersen & Co., Feb. 1988.
Teacher's Handbook for Math Concepts and Skills Computer Curriculum Corporation By Agulnick et al., pp. 1–126, 1991.
CBT Systems By The Training Resource, pp. i–xxiii and 1–51, 1992.
Computer assisted diagnostic prescriptive program in reading and mathematics, by Robertson et al., US Dept of Education, Washington, DC, Jan. 1986.
The new component design theory: instructional design for courseware authoring, by D. Merrill, Instructional Science 16: 19–34, 1987.
Teacher's Handbook for English as a Second Language by Computer Curriculum Corporation, Feb. 1985.
The CCC Instructional System, Jul. 1990.
CCC Graphics Server, Preliminary Information for Proctors, Jul. 17, 1987.
Important Information on Speech System Use for Release 12 Courses, by Barbara Tingey, Mar. 22, 1988.
CCC Graphics Server, Product Description, May. 1987.
Teacher's Handbook for Initial Reading by Computer Curriculum Corporation, Jul. 1988.
Interoffice Memorandum, MAC Platform News, by D. Salvadori, Mar. 19, 1991.
Marketing Reference Manual.
An Overview of the CCC Instructional System on the IBM PS/2, Computer Curriculum Corporation, Jan. 1991.
Marketing Reference Manual, System Planning.
Marketing Reference Manual, Questions and Answers.
The Well–Managed Classroom, by Bobby Goodson, Teaching and Computers, Nov./Dec. 1988.
EPIE Report Summary for Computer Curriculum Corporation, Apr. 1990.
Introducing the newest member of CCC's winning team, by Computer Curriculum Corporation.
Intelligent Tutoring Systems—The Current State of the Art, by Riichiro Mizoguchi, The Transactions of the IEICE, vol. E 73, No. 3, Mar. 1990.
The Intelligent Design of Computer–assisted instruction, Chapter 9, by Venezky et al., Longman, 1991.
Computer Managed Instruction at Arthur Andersen & Company: A Status Report, by Dennis et al., Mar. 1992.
2.0 CMI Overview, CMI Guidelines, by AICC, Oct. 25, 1993.
Performance Support Systems: Integrating AI, Hypermedia, and CBT to enhance user performance, by Karen McGraw, JI. Of Artificial Intelligence in Education 5(1), 3–26, 1994.
The use of pre–test and post–test in call: A case study, by Blin et al., Computers Educ. vol. 23, No. 1/2, pp. 143–150, 1994.
CMI Guidelines for Interoperability by AICC, Jan. 26, 1996.
CBT Campus Tour Preview by CBT System, 1997.
Registrar, Silton–Bookman Systems Inc., 1997.
Silton–Bookan Systems, Registrar, Sep. 24, 1997.
Training Multimedia, vol. 3, #1, How to Manage Benchmark Multimedia Based Training, 1997.

DigitalThink: A classroom on the Web, by Paul Williams, New Media, May 5, 1997.
Netting on Education, by Laura Castaneda, San Francisco Chronicle, Business, Jul. 24, 1997.
Knowledge Inc., vol. 2, No. 8, Aug. 1997.
Computer Managed Instruction, AICC Guidelines and Recommendations, by AICC, Oct. 9, 1997.
Hands On: Java Tutorials, Insider Technology Training, by Ned Snell, Nov. 1997.
Implementation Strategies for Web–based training and performance support, by International Quality & Productivity Center, Nov. 17–19, 1997.
CMI Guidelines for Interoperability by AICC, Feb. 1998.
Keeping Track, Inside Technology Training, by Sarah Auerbach, Jul./Aug. 1998.
Education Uses of the Plato Computer System, Science, vol. 192, No. 4237 by Smith et al., Apr. 23, 1976.
The Design and Implementation of a Dynamically Tailored Examination, SIGSCE Bulletin, vol. 9, No. 3, pp. 59–62 by Lawrence Whitlock, Aug. 1977.
William C. Norris: Portrait of a Maverick, Ballinger Publishing Company by Worthy et al., 1987.
Web–Based Training Cookbook, Wiley Computer Publishing by Brandon Hall, 1997.
Plato Rising: Online learning for Atarians, www.atarimagazines.com/v3n3/platorising.html, by Small et al., 2003.
Free–Body Diagrams (a Plato Lesson) by Bruce Arne Sherwood, published in the American Journal of Physics, vol. 39, Nos. 1–12, pp. 1199–1203, Oct. 1971.
The use of computers in the teaching of Chemistry by Smith et al., published in the Journal of Chemical Education, vol. 51, No. 4, pp. 243–244, Apr. 1974.
The Off–Line Plato System by Stanley G. Smith, published in the Journal of Chemical Education, vol. 56, No. 12, pp. 781–782, Dec. 1979.
Network Operating Systems by CBT Systems Ltd., pp. 5 and 10–13, 1994.
CBTCampus Administrator's Guide, Version 1.01, by CBT Systems, pp. 6–10, 25, 26, 31–34, 37, 38, 61, 62, 77–84, 87, 88 and 127–166, Mar. 1998.
CBT Systems By The Training Resource, pp. i–xxxiv and 1–101, 1993.
SuccessMaker Reports Guide by Computer Curriculum Corporation, pp. i–v and 1–150, 1993.
SuccessMaker Reports Quick Reference Guide By Computer Curriculum Corporation, pp. i–iii and 1–18, 1993.
SuccessMaker Instructional Management by Computer Curriculum Corporation, pp. 1–74+forms, 1993.
SuccessMaker Math Concepts and Skills by Computer Curriculum Corporation, pp. i–iv and 1–167, 1993.
User's Guide for Success Maker by Computer Curriculum Corporation, pp. 3–10, 1993.
How to use the CBT Tracs System Administrator's Guide by CBT Systems Ltd, pp. 1–29, 1994.
CBT Wintracs by CBT Systems Ltd, pp. 1–47, 1994.
Full curriculum software personal selection help by EISI Software Institute, pp. 495, 500–503, 511, 517–527, 575–581, 583–585, Jan. 1994.
CBT Systems by The Training Resource, pp. 3–256, Spring 1995.

The development of a health careers database computer program, A University of Houston Dissertation by Ava Miller, May 1995.

Knowledge Management Case Study, Knowledge Management at Microsoft, 1997 By Thomas Davenport, 1996.

Wintracs by CBT Systems Ltd, pp. 65–97, Sep. 1997.

Teltech The business of knowledge management case study By Thomas Davenport, pp. 1–9. www.bus_utexas.edu/kman/telcase.htm, Apr. 1996.

SkillView. Engineering a More Productive WorkForce by SkillView Technologies, Before 2003.

Arthur Andersen & Co. Industry Education Computer Based Training Strategy, Appendixes—Data Base Learning Model, Feb. 1988. Note, to avoid confusion, page number designations have been manually added to Appendices E and F of this reference (e.g. E–1, E–2 . . . F–1, F–2, etc.).

SkillView: Engineering a More Productive WorkForce ("SkillView"), product brochure, Jun.–Jul. 1996 and enclosed letter and affidavit supporting publication date.

* cited by examiner

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 37-52 is confirmed.

Claims 1, 3, 10, 27, 31, 55, 56 and 70 are cancelled.

Claims 2, 4, 8, 9, 11, 14, 15, 22, 24, 25, 28, 29, 32, 33, 53, 58, 66-69, 71, 74, 80, 82 and 84 are determined to be patentable as amended.

Claims 5-7, 12, 13, 16-21, 23, 26, 30, 34-36, 54, 57, 59-65, 72, 73, 75-79, 81, 83 and 85-86, dependent on an amended claim, are determined to be patentable.

2. A computer-aided learning method [as recited in claim 1 further comprising the steps of:] *for a user comprising the steps of:*

*retrieving, by a first computer, materials related to the user; and*

*permitting, by the computer, the user to access materials regarding at least one learning user if the user is an institute user, as determined based on an identifier of the user, wherein the institute user accesses the materials to identify a learning user for filling a job position;* tracking, by the computer, materials regarding the user; and updating, by the computer, materials regarding the user based on the tracked materials, *and*

*wherein if the user is the institute user, the institute user can learn about the at least one learning user in an area the institute user is interested;*

*wherein the materials accessed can be retrieved by at least one of the users from another computer, which is connected to the first computer through a network;*

*wherein the institute user pays to access materials regarding the at least one learning user; a learning user is allowed to access materials on a subject to learn and to work on, to perform a task; materials on at least one of the users can be tracked and updated; and*

*wherein the method further comprises ascertaining materials for a learning user to learn based on an attribute of the learning user.*

4. A computer-aided learning method as recited in claim [3] *2* wherein [the step of ascertaining] *at least a portion of the materials ascertained* depends on the user's educational background, work experience and preferences.

8. A computer-aided learning method [as recited in claim 7] *for a user comprising the steps of:*

*retrieving, by a first computer, materials related to the user;*

*permitting, by the computer, the user to access materials regarding at least one learning user if the user is an institute user, as determined based on an identifier of the user;*

*tracking, by the computer, materials regarding the user; and*

*updating, by the computer, materials regarding the user based on the tracked materials,*

*wherein if the user is the institute user, the institute user can learn about the at least one learning user in an area the institute user is interested;*

*wherein the materials accessed can be retrieved by at least one of the users from another computer, which is connected to the first computer through a network;*

*wherein the institute user pays to access materials regarding the at least one learning user; a learning user is allowed to access materials on a subject to learn and to work on, to perform a task; and materials on at least one of the users can be tracked and updated;*

*wherein the method further comprises ascertaining materials for a learning user to learn based on an attribute of the learning user;*

*wherein if the user is a learning user, the step of tracking includes tracking the user's learning activities; wherein the user is learning features of a product and the activities tracked include the one or more features the user worked on; and* wherein the method is implemented at a Web site.

9. A computer-aided learning method [as recited in claim 2] *for a user comprising the steps of:*

*retrieving, by a first computer, materials related to the user;*

*permitting, by the computer, the user to access materials regarding at least one learning user if the user is an institute user, as determined based on an identifier of the user;*

*tracking, by the computer, materials regarding the user; and*

*updating, by the computer, materials regarding the user based on the tracked materials,*

*wherein if the user is the institute user, the institute user can learn about the at least one learning user in an area the institute user is interested;*

*wherein the materials accessed can be retrieved by at least one of the users from another computer, which is connected to the first computer through a network;*

*wherein the institute user pays to access materials regarding the at least one learning user; a learning user is allowed to access materials on a subject to learn and to work on, to perform a task; and materials on at least one of the users can be tracked and updated;*

*wherein the method further comprises ascertaining materials for a learning user to learn based on an attribute of the learning user; and* wherein a learning user may restrict institute users from accessing certain materials regarding the learning user.

11. A computer-aided learning method as recited in claim [10] *2* further comprising the step of querying materials on learning users to identify a learning user to fill the job position based on criteria set by the institute user.

14. A computer-aided learning method as recited in claim [10] *2* wherein the method is implemented at a Web site.

15. A computer-aided learning method [as recited in claim 2 further comprising the step of] *for a user comprising the steps of:*

*retrieving, by a first computer, materials related to the user;*

*permitting, by the computer, the user to access materials regarding at least one learning user if the user is an institute user, as determined based on an identifier of the user;* tracking, by the computer, materials regarding the user;
updating, by the computer, materials regarding the user based on the tracked materials; and
allowing the user to advertise if the user is an institute user,
wherein if the user is the institute user, the institute user can learn about the at least one learning user in an area the institute user is interested;
wherein the materials accessed can be retrieved by at least one of the users from another computer, which is connected to the first computer through a network; and
wherein the institute user pays to access materials regarding the at least one learning user; a learning user is allowed to access materials to learn; and materials on at least one of the users can be tracked and updated.

22. A computer-aided learning method [as recited in claim 2] *for a user comprising the steps of:*
*retrieving, by a first computer, materials related to the user;*
*permitting, by the computer, the user to access materials regarding at least one learning user if the user is an institute user, as determined based on an identifier of the user;*
*tracking, by the computer, materials regarding the user; and*
*updating, by the computer, materials regarding the user based on the tracked materials,*
*wherein if the user is the institute user, the institute user can learn about the at least one learning user in an area the institute user is interested;*
*wherein the materials accessed can be retrieved by at least one of the users from another computer, which is connected to the first computer through a network;*
*wherein the institute user pays to access materials regarding the at least one learning user; a learning user is allowed to access materials on a subject to learn and to work on, to perform a task; and materials on at least one of the users can be tracked and updated;*
*wherein the method further comprises ascertaining materials for a learning user to learn based on an attribute of the learning user; and*
wherein the materials to learn include materials on features of a product introduced by an institute user.

24. A computer-aided learning method [as recited in claim 1] *for a user comprising the steps of:*
*retrieving, by a first computer, materials related to the user; and*
*permitting, by the computer, the user to access materials regarding at least one learning user if the user is an institute user, as determined based on an identifier of the user;*
*wherein if the user is the institute user, the institute user can learn about the at least one learning user in an area the institute user is interested;*
*wherein the materials accessed can be retrieved by at least one of the users from another computer, which is connected to the first computer through a network;*
*wherein the institute user pays to access materials regarding the at least one learning user; a learning user is allowed to access materials on a subject to learn and to work on, to perform a task; and materials on at least one of the users can be tracked and updated;*
*wherein the method further comprises ascertaining materials for a learning user to learn based on an attribute of the learning user; and*
wherein materials regarding the at least one learning user is categorized into confidential and nonconfidential such that confidential materials are not accessible by the institute user without the at least one learning user's express consent.

25. A computer-aided learning apparatus for a user comprising:
A retriever configured to retrieve materials related to the user; and
A determinator configured to permit the user to access materials regarding at least one learning user if the user is an institute user, as determined based on an identifier of the user;
wherein if the user is the institute user, the institute user can learn about the at least one learning user in an area the institute user is interested;
wherein the materials accessed can be retrieved by at least one of the users from another computer, which is connected to the apparatus through a network; [and]
wherein the institute user pays to access materials regarding the at least one learning user; a learning user is allowed to access materials *on a subject* to learn *and to work on, to perform a task*; and materials on at least one of the users can be tracked and updated;
*wherein the apparatus further comprises a learning materials ascertainer configured to ascertain materials for a learning user to learn based on an attribute of the learning user; and*
*wherein materials regarding the at least one learning user are categorized into confidential and non-confidential such that confidential materials are not accessible by the institute user without the at least one learning user's express consent.*

28. A computer-aided learning apparatus [as recited in claim 27] *for a user comprising:*
*a retriever configured to retrieve materials related to the user; and*
*a determinator configured to permit the user to access materials regarding at least one learning user if the user is an institute user, as determined based on an identifier of the user, wherein the institute user accesses the materials to identify a learning user for filling a job position;*
*wherein if the user is the institute user, the institute user can learn about the at least one learning user in an area the institute user is interested;*
*wherein the materials accessed can be retrieved by at least one of the users from another computer, which is connected to the apparatus through a network;*
*wherein the institute user pays to access materials regarding the at least one learning user; a learning user is allowed to access materials on a subject to learn and to work on, to perform a task; and materials on at least one of the users can be tracked and updated; and*
*wherein the apparatus further comprises a learning materials ascertainer configured to ascertain materials for a learning user to learn based on an attribute of the learning user.*

29. A computer-aided learning apparatus [as recited in claim 28 further] *for a user* comprising:
*a retriever configured to retrieve materials related to the user;*
*a determinator configured to permit the user to access materials regarding at least one learning user if the* user is an institute user, as determined based on an identifier of the user;
a tracker configured to track materials regarding the user;
an updater configured to update materials regarding the user based on the tracked materials;
a learning materials ascertainer configured to ascertain materials for the user to learn if the user is a learning user; and
an advertisement generator configured to allow the user to advertise if the user is an institute user;
wherein if the user is the institute user, the institute user can learn about the at least one learning user in an area the institute user is interested;
wherein the materials accessed can be retrieved by at least one of the users from another computer, which is connected to the apparatus through a network;
wherein the institute user pays to access materials regarding the at least one learning user; a learning user is allowed to access materials to learn; and materials on at least one of the users can be tracked and updated; and
wherein the institute user accesses the materials to identify a learning user for filling a job position.

32. A computer-aided learning method for a user comprising:
receiving, by a receiving computer, materials entered by the user; and
presenting, by the receiving computer, materials accessed by the user;
wherein the receiving computer is coupled to another computer through a network, and the another computer, including a Web server, retrieves materials related to the user; permits the user to access materials regarding at least one learning user if the user is an institute user, as determined based on an identifier of the user; [wherein] if the user is the institute user, [the institute user can] *allows the user to* learn about the at least one learning user in an area the institute user is interested; and allows the user to access materials *on a subject* to learn if the user is a learning user, who pays less than an institute user to access materials[, so as to encourage the learning user to work on materials to learn]; and
*wherein* materials on at least one of the users can be tracked and updated; *the learning user allowed to access materials works for the institute user, the learning user is tested, and the learning progress of the learning user is monitored; at least a portion of the materials to learn depends on an objective of the institute user; and at least a portion of the materials to learn is from the institute user.*

33. A computer-aided learning method [as recited in claim 32] *for a user comprising:*
*receiving, by a receiving computer, materials entered by the user; and*
*presenting, by the receiving computer, materials accessed by the user;*
*wherein the receiving computer is coupled to another computer through a network, and the another computer retrieves materials related to the user; permits the user to access materials regarding at least one learning user if the user is an institute user, as determined based on an identifier of the user; wherein if the user is the institute user, the institute user can learn about the at least one learning user in an area the institute user is interested; and allows the user to access materials to learn if the user is a learning user, who pays less than an institute user to access materials, so as to encourage the learning user to work on materials to learn; and materials on at least one of the users can be tracked and updated; and*
wherein materials accessed by a learning user include materials on a product of an institute user, with advertisement related to that institute user also presented if the materials are accessed.

53. A computer-aided learning method for a user comprising the steps of:
retrieving, by a first computer, materials related to the user; *and*
permitting, by the computer, the user to access materials regarding at least one learning user if the user is an institute user, as determined based on an identifier of the user;
wherein if the user is the institute user, the institute user can learn about the at least one learning user in an area the institute user is interested;
wherein the materials accessed can be retrieved by at least one of the users from another computer, which is connected to the first computer through a network;
wherein the institute user pays so that materials can be accessed;
wherein a learning user is allowed to access materials *on a subject* to learn *and to work on, to perform a task;*
*wherein the method further comprises ascertaining materials for a learning user to learn based on an attribute of the learning user;*
*wherein the method further comprises searching the materials to learn, to identify materials under a title;*
wherein materials on at least one of the users can be monitored and updated; and
wherein the first computer includes a Web server.

58. A computer-aided learning method [as recited in claim 53] *for a user comprising the steps of:*
*retrieving, by a first computer, materials related to the user; and*
*permitting, by the computer, the user to access materials regarding at least one learning user if the user is an institute user, as determined based on an identifier of the user;*
*wherein if the user is the institute user, the institute user can learn about the at least one learning user in an area the institute user is interested;*
*wherein the materials accessed can be retrieved by at least one of the users from another computer, which is connected to the first computer through a network;*
*wherein the institute user pays so that materials can be accessed;*
*wherein a learning user is allowed to access materials on a subject to learn and to work on, to perform a task;*
*wherein the method further comprises ascertaining materials for a learning user to learn based on an attribute of the learning user;*
*wherein materials on at least one of the users can be monitored and updated;*
*wherein the first computer includes a Web server; and*
wherein at least a portion of the materials to learn depends on an interest of the learning user allowed to access materials.

66. A computer-aided learning method [as recited in claim 53] *for a user comprising the steps of:*

*retrieving, by a first computer, materials related to the user; and*

*permitting, by the computer, the user to access materials regarding at least one learning user if the user is an institute user, as determined based on an identifier of the user;*

*wherein if the user is the institute user, the institute user can learn about the at least one learning user in an area the institute user is interested;*

*wherein the materials accessed can be retrieved by at least one of the users from another computer, which is connected to the first computer through a network;*

*wherein the institute user pays so that materials can be accessed;*

*wherein a learning user is allowed to access materials on a subject to learn and to work on, to perform a task;*

*wherein the method further comprises ascertaining materials for a learning user to learn based on an attribute of the learning user;*

*wherein materials on at least one of the users can be monitored and updated;*

*wherein the first computer includes a Web server; and* wherein at least a portion of the materials to learn is from the institute user.

67. A computer-aided learning method [as recited in claim 53 further comprising] *for a user comprising the steps of:*

*retrieving, by a first computer, materials related to the user;*

*permitting, by the computer, the user to access materials regarding at least one learning user if the user is an institute user, as determined based on an identifier of the user; and* identifying by the institute user a person to do a job depending on an objective of the institute user;

*wherein if the user is the institute user, the institute user can learn about the at least one learning user in an area the institute user is interested;*

*wherein the materials accessed can be retrieved by at least one of the users from another computer, which is connected to the first computer through a network;*

*wherein the institute user pays so that materials can be accessed;*

*wherein a learning user is allowed to access materials on a subject to learn and to work on, to perform a task;*

*wherein the method further comprises ascertaining materials for a learning user to learn based on an attribute of the learning user;*

*wherein materials on at least one of the users can be monitored and updated; and*

*wherein the first computer includes a Web server.*

68. A computer-aided learning method [as recited in claim 53] *for a user comprising the steps of:*

*retrieving, by a first computer, materials related to the user; and*

*permitting, by the computer, the user to access materials regarding at least one learning user if the user is an institute user, as determined based on an identifier of the user;*

*wherein if the user is the institute user, the institute user can learn about the at least one learning user in an area the institute user is interested;*

*wherein the materials accessed can be retrieved by at least one of the users from another computer, which is connected to the first computer through a network;*

*wherein the institute user pays so that materials can be accessed;*

*wherein a learning user is allowed to access materials on a subject to learn and to work on, to perform a task;*

*wherein the method further comprises ascertaining materials for a learning user to learn based on an attribute of the learning user;*

*wherein materials on at least one of the users can be monitored and updated;*

*wherein the first computer includes a Web server; and* wherein the learning user allowed to access materials is monitored, and the method further comprises identifying by the institute user that learning user to do a job based on materials regarding that learning user.

69. A computer-aided learning method [as recited in claim 53] *for a user comprising the steps of:*

*retrieving, by a first computer, materials related to the user; and*

*permitting, by the computer, the user to access materials regarding at least one learning user if the user is an institute user, as determined based on an identifier of the user;*

*wherein if the user is the institute user, the institute user can learn about the at least one learning user in an area the institute user is interested;*

*wherein the materials accessed can be retrieved by at least one of the users from another computer, which is connected to the first computer through a network;*

*wherein the institute user pays so that materials can be accessed;*

*wherein a learning user is allowed to access materials on a subject to learn and to work on, to perform a task;*

*wherein the method further comprises ascertaining materials for a learning user to learn based on an attribute of the learning user;*

*wherein materials on at least one of the users can be monitored and updated;*

*wherein the first computer includes a Web server; and* wherein at least a portion of the materials to learn allows the learning user to follow a scenario to solve a problem in a job.

71. A computer-aided learning method as recited in claim [70] *53* further comprising prioritizing the searched results to be presented.

74. A computer-aided learning method [as recited in claim 73] *for a user comprising the steps of:*

*retrieving, by a first computer, materials related to the user;*

*permitting, by the computer, the user to access materials regarding at least one learning user if the user is an institute user, as determined based on an identifier of the user;*

*wherein if the user is the institute user, the institute user can learn about the at least one learning user in an area the institute user is interested;*

*wherein the materials accessed can be retrieved by at least one of the users from another computer, which is connected to the first computer through a network;*

*wherein the institute user pays so that materials can be accessed;* wherein a learning user is allowed to access materials to learn;

wherein materials on at least one of the users can be monitored and updated;

wherein the first computer includes a Web server;

wherein the learning user allowed to access materials, works for the institute user; wherein the method further comprises testing that learning user; and wherein the learning progress of that learning user is monitored;

wherein at least a portion of the materials to learn depends on an objective of the institute user, and wherein at least a portion of the materials to learn is from the institute user.

80. A computer-aided learning method [as recited in claim 73] *for a user comprising the steps of:*

*retrieiving, by a first computer, materials related to the user;*

*permitting, by the computer, the user to access materials regarding at least one learning user if the user is an institute user, as determined based on an identifier of the user;*

*wherein if the user is the institute user, the institute user can learn about the at least one learning user in an area the institute user is interested;* wherein the materials accessed can be retrieved by at least one of the users from another computer, which is connected to the first computer through a network;

wherein the institute user pays so that materials can be accessed;

wherein a learning user is allowed to access materials to learn;

wherein materials on at least one of the users can be monitored and updated;

wherein the first computer includes a Web server;

wherein the learning user allowed to access materials, works for the institute user; wherein the method further comprises testing that learning user; and wherein the learning progress of that learning user is monitored;

wherein at least a portion of the materials to learn is modularized as learning objects, wherein at least a portion of the materials to learn is for a customer of the institute user to learn, and wherein at least a portion of the materials to learn, depends on a job of that learning user.

82. A computer-aided learning method [as recited in claim 73] *for a user comprising the steps of:*

*retrieving, by a first computer, materials related to the user;*

*permitting, by the computer, the user to access materials regarding at least one learning user if the user is an institute user, as determined based on an identifier of the user;*

*wherein if the user is the institute user, the institute user can learn about the at least one learning user in an area the institute user is interested;* wherein the materials accessed can be retrieved by at least one of the users from another computer, which is connected to the first computer through a network;

wherein the institute user pays so that materials can be accessed;

wherein a learning user is allowed to access materials to learn;

wherein materials on at least one of the users can be monitored and updated;

wherein the first computer includes a Web server;

wherein the learning user allowed to access materials, works for the institute user; wherein the method further comprises testing that learning user; and wherein the learning progress of that learning user is monitored;

wherein at least a portion of the materials to learn depends on an interest of that learning user, and wherein at least a portion of the materials to learn depends on a job of that learning user.

84. A computer-aided learning method [as recited in claim 73] *for a user comprising the steps of:*

*retrieving, by a first computer, materials related to the user;*

*permitting, by the computer, the user to access materials regarding at least one learning user if the user is an institute user, as determined based on an identifier of the user;*

*wherein if the user is the institute user, the institute user can learn about the at least one learning user in an area the institute user is interested;* wherein the materials accessed can be retrieved by at least one of the users from another computer, which is connected to the first computer through a network;

wherein the institute user pays so that materials can be accessed;

wherein a learning user is allowed to access materials to learn;

wherein materials on at least one of the users can be monitored and updated;

wherein the first computer includes a Web server;

wherein the learning user allowed to access materials, works for the institute user; wherein the method further comprises testing that learning user; and wherein the learning progress of that learning user is monitored;

wherein at least a portion of the materials to learn is for a customer of the institute user to learn, wherein at least a portion of the materials to learn depends on an interest of that learning user, and wherein at least a portion of the materials to learn depends on an area related to the background of that learning user.

\* \* \* \* \*